(12) United States Patent
Wittenschlaeger

(10) Patent No.: US 11,752,882 B1
(45) Date of Patent: Sep. 12, 2023

(54) SYSTEMS AND METHODS FOR CONTROLLING VEHICLE ACCELERATION TO REGULATE ENVIRONMENTAL IMPACT

(71) Applicant: AYRO, Inc., Round Rock, TX (US)

(72) Inventor: Thomas M. Wittenschlaeger, Sarasota, FL (US)

(73) Assignee: AYRO, INC., Round Rock, TX (US)

( * ) Notice: Subject to any disclaimer, the term of this patent is extended or adjusted under 35 U.S.C. 154(b) by 0 days.

(21) Appl. No.: 18/052,429

(22) Filed: Nov. 3, 2022

(51) Int. Cl.
| | |
|---|---|
| *B60L 15/20* | (2006.01) |
| *B60W 30/02* | (2012.01) |
| *B60W 30/18* | (2012.01) |
| *B60W 40/107* | (2012.01) |
| *B60W 40/02* | (2006.01) |
| *B60W 10/08* | (2006.01) |
| *B60W 10/26* | (2006.01) |
| *B60W 10/18* | (2012.01) |
| *G05D 1/02* | (2020.01) |

(52) U.S. Cl.
CPC ......... *B60L 15/2009* (2013.01); *B60W 10/08* (2013.01); *B60W 10/18* (2013.01); *B60W 10/26* (2013.01); *B60W 30/02* (2013.01); *B60W 30/18127* (2013.01); *B60W 30/18172* (2013.01); *B60W 40/02* (2013.01); *B60W 40/107* (2013.01); *G05D 1/0223* (2013.01); *B60W 2510/244* (2013.01); *B60W 2540/18* (2013.01); *B60W 2720/106* (2013.01)

(58) Field of Classification Search
CPC ...... B60L 3/08; B60L 7/18; B60L 7/26; B60L 15/2009; B60L 2200/22; B60T 8/172; B60T 8/17551; B60T 2250/02; B60T 2270/604; B60W 30/18127; B60W 30/18172; B60W 30/02; G01M 1/122; G01M 1/125; G05D 1/0223
See application file for complete search history.

(56) References Cited

U.S. PATENT DOCUMENTS

| | | | |
|---|---|---|---|
| 5,136,513 A | 8/1992 | Sol et al. | |
| 5,502,957 A | * 4/1996 | Robertson | .......... A01D 34/6806 56/10.2 G |

(Continued)

FOREIGN PATENT DOCUMENTS

| | | | | |
|---|---|---|---|---|
| CN | 105774563 A | 7/2016 | | |
| DE | 102004032720 A1 | * 2/2006 | .............. | B60T 8/172 |

(Continued)

OTHER PUBLICATIONS

EPO machine translation of JP 2012-65602 A (original JP document published Apr. 5, 2012) (Year: 2012).*

(Continued)

*Primary Examiner* — David A Testardi
(74) *Attorney, Agent, or Firm* — HAYNES AND BOONE, LLP

(57) ABSTRACT

A vehicle for traversing an area to regulate a surface impact on a terrain over which the vehicle travels is described. The vehicle includes a motor, a braking system, and a controller coupled to the motor and the braking system. The controller is configured to determine a real-time center of gravity of the vehicle, and the controller is configured to control the vehicle, based on the real-time center of gravity of the vehicle, to regulate the surface impact on the terrain over which the vehicle travels.

26 Claims, 10 Drawing Sheets

(56) References Cited

U.S. PATENT DOCUMENTS

| | | | | |
|---|---|---|---|---|
| 5,551,771 | A | * | 9/1996 | Akuzawa ................ B60T 8/885<br>303/186 |
| 8,583,354 | B2 | | 11/2013 | Klier |
| 8,825,294 | B2 | | 9/2014 | Norris et al. |
| 11,254,348 | B2 | | 2/2022 | Niwa et al. |
| 2005/0004732 | A1 | * | 1/2005 | Berry ................ B60W 50/045<br>701/36 |
| 2005/0017574 | A1 | * | 1/2005 | Weiberle ............ B60T 13/741<br>303/3 |
| 2005/0269875 | A1 | * | 12/2005 | Maki ...................... B60T 8/38<br>303/152 |
| 2007/0029874 | A1 | * | 2/2007 | Finch ...................... B60T 1/10<br>303/152 |
| 2007/0265749 | A1 | * | 11/2007 | Fitzgibbons .......... B60W 50/00<br>701/37 |
| 2009/0069149 | A1 | * | 3/2009 | Okumura ........ B60W 30/18127<br>477/29 |
| 2010/0204891 | A1 | * | 8/2010 | Biggerstaff ........... E02F 9/2033<br>701/50 |
| 2011/0238251 | A1 | * | 9/2011 | Wright ................ B60L 15/2054<br>701/22 |
| 2011/0288707 | A1 | * | 11/2011 | Westlake ............. B60K 7/0007<br>701/22 |
| 2011/0303497 | A1 | * | 12/2011 | Gaffney .................. B60T 7/042<br>188/106 P |
| 2012/0046846 | A1 | * | 2/2012 | Dollens ................ B60K 17/356<br>701/99 |
| 2012/0159916 | A1 | * | 6/2012 | Ishii ........................ B60L 1/003<br>56/10.2 G |
| 2012/0215413 | A1 | * | 8/2012 | Kluka ................... B60W 50/00<br>701/1 |
| 2012/0255799 | A1 | * | 10/2012 | Kohler .................... B60L 58/20<br>180/65.245 |
| 2013/0030650 | A1 | * | 1/2013 | Norris ................ B60G 17/0182<br>701/40 |
| 2015/0005982 | A1 | * | 1/2015 | Muthukumar ........ B60T 8/1725<br>701/1 |
| 2015/0203117 | A1 | * | 7/2015 | Kelly .................. F16H 61/0213<br>701/91 |
| 2016/0023657 | A1 | * | 1/2016 | Fairgrieve ............. B60W 10/18<br>701/93 |
| 2016/0207418 | A1 | * | 7/2016 | Bergstrom ............... B60G 3/08 |
| 2016/0214474 | A1 | * | 7/2016 | Igi ....................... B60K 7/0007 |
| 2016/0244057 | A1 | * | 8/2016 | Kelly .................. B60W 30/143 |
| 2017/0190330 | A1 | * | 7/2017 | Kelly .................... B60W 30/02 |
| 2017/0197619 | A1 | * | 7/2017 | Kelly .................... B60W 10/04 |
| 2021/0061302 | A1 | * | 3/2021 | Hashizume .......... G05D 1/0223 |
| 2021/0086709 | A1 | * | 3/2021 | Islam .................... B60W 10/30 |
| 2021/0094407 | A1 | * | 4/2021 | Payne .................. B60K 7/0007 |
| 2021/0368674 | A1 | * | 12/2021 | Eliasson ................ A01D 69/02 |
| 2022/0169215 | A1 | * | 6/2022 | Muramatsu ............ B60T 8/172 |
| 2022/0289038 | A1 | * | 9/2022 | Yokoo ....................... B60L 7/18 |
| 2022/0289234 | A1 | * | 9/2022 | Zhang .................... B60W 40/10 |

FOREIGN PATENT DOCUMENTS

| | | | | |
|---|---|---|---|---|
| JP | 2012065602 | A | * | 4/2012 |
| JP | 2012070673 | A | * | 4/2012 |
| WO | WO-2015098166 | A1 | * | 7/2015 .............. B60L 1/003 |

OTHER PUBLICATIONS

Report to Congress, "Operation of Neighborhood Electric Vehicles (NEVs) on Roadways with a Maximum Speed Limit of 40 mph (64 kph): Fuel Consumption Savings and Safety Ramifications," U.S. D.O.T., Washington, D.C., Jun. 2012, 54 pages (Year: 2012).*

Texas Transportation Code Title 7, Subtitle C, Section 551: Operation of bicycles and mopeds, golf carts, and other low-powered vehicles, Subchapter D. Neighborhood Electric Vehicles, effective Sep. 1, 2019, 16 pages. (Year: 2019).*

ECFR, 49 CFR 571.3—Definitions. Definition of Low-speed vehicle (LSV), last amended Sep. 26, 2022, 5 pages. (Year: 2022).*

ECFR, 49 CFR 571.500—Standard No. 500 Low-speed vehicles, last amended Jun. 8, 2022, 2 pages (Year: 2022).*

De Bruyne, Stijn, Van der Auweraer, Herman, Diglio Paola, and Anthonis, Jan; Online Estimation of Vehicle Inertial Parameters for Improving Chassis Control Systems; International Federation of Automatic Control (IFAC); 18th IFAC World Congress Milano (Italy) Aug. 28-Sep. 2, 2011; 6pp.

Zhang Wei, Yang, Jue, Zhang, Wenming, and Ma, Fei; Research on Regenerative Braking of Pure Electric Mining Dump Truck, World Electric Vehicle Journal, Jun. 8, 2019, 10, 39; 17pp.

Berg, Allen. (May 19, 2022). "The Physics of Racing Part 1: Weight Transfer". Retrieved from: https://www.allenbergracingschools.com/expert-advice/physics-racing-part-1-weight-transfer/.

Laukkonen, Jeremy. (Sep. 8, 2021). "What Is Drive-By-Wire Technology?". Retrieved from https://www.lifewire.com/what-is-drive-by-wire-534825.

"What is telematics?". (Mar. 26, 2021). GEOTAB. Retrieved from: https://www.geotab.com/blog/what-is-telematics/.

* cited by examiner

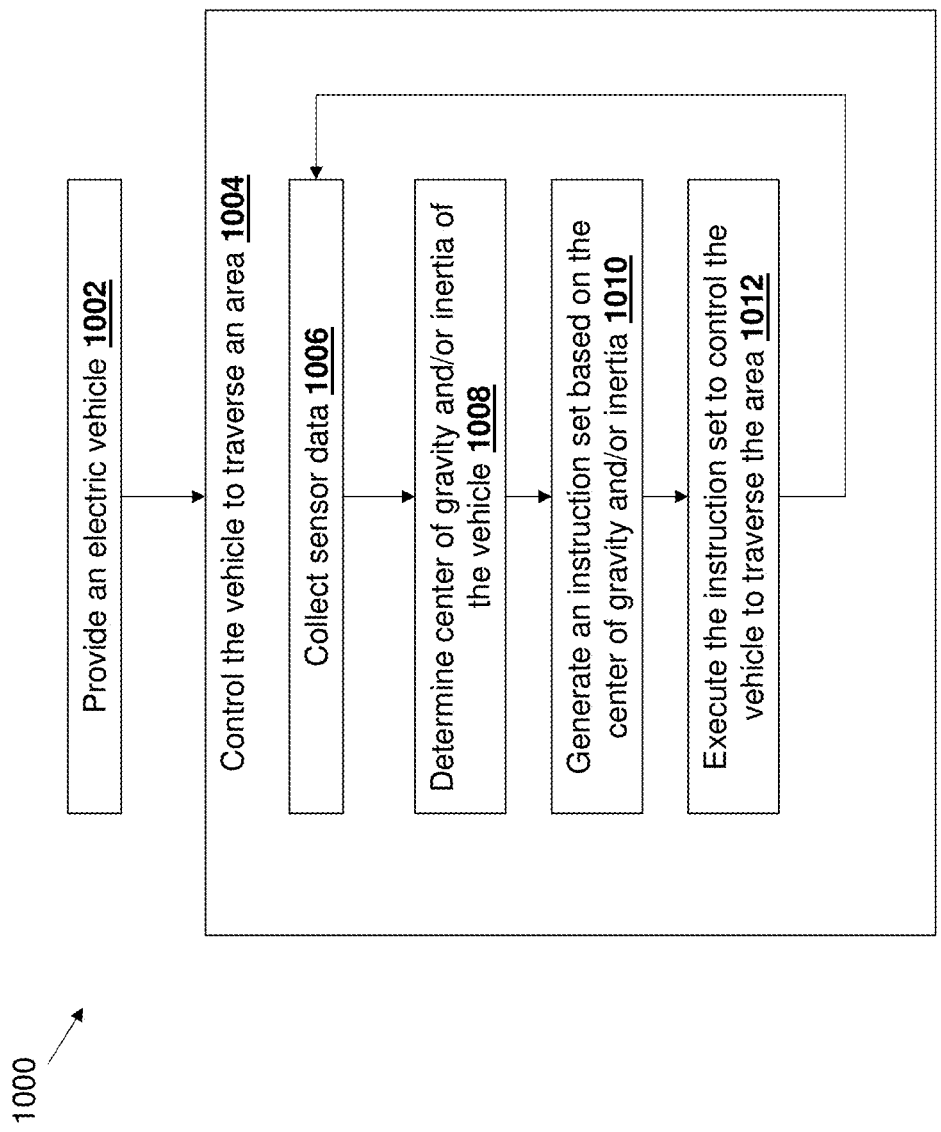

SYSTEMS AND METHODS FOR CONTROLLING VEHICLE ACCELERATION TO REGULATE ENVIRONMENTAL IMPACT

FIELD OF THE INVENTION

The field of the invention is technologies associated with vehicle environmental impact reduction and elimination, and in particular, regulating the environmental impact of an electric vehicle by controlling vehicle acceleration.

BACKGROUND

The background description includes information that may be useful in understanding the present inventive subject matter. It is not an admission that any of the information provided herein is prior art or applicant admitted prior art, or relevant to the presently claimed inventive subject matter, or that any publication specifically or implicitly referenced is prior art or applicant admitted prior art.

With the dawn of widespread development and use of electric vehicles, there has also been diversification of specific markets for such vehicles from large cargo carrying trucks down to micro drones. One specific market area that has developed over the last several years includes the market for low-speed vehicles (LSVs), which typically include four-wheel electric vehicles having a top speed of about 25 to 35 miles per hour (about 40 to 56 kilometers per hour). LSVs have found many target use cases including last mile delivery, maintenance for campus, forestry, or other areas where there is no need for heavy or cumbersome traditional vehicles. However, even though LSVs are already environmentally sound (e.g., light weight, low to no fossil fuel emissions, low noise, etc.), they can still have significant negative environmental impacts. For example, a maintenance LSV might need to traverse a natural, unpaved area (e.g., a field, lawn, meadow, etc.). In such cases, the wheels of the vehicle still may rip up the natural terrain during acceleration, such as when power is engaged or when braking, which can damage the environment. Further, in areas where there are significant differences in terrain, possibly including slopes, pavement, lawn, etc., an operator of the LSV might engage power in a manner that is not environmentally sound for the local environment or in a manner that could even be dangerous given the local conditions.

Even though great strides have been made in electric vehicles, there remains a need to ensure electric vehicles have reduced impact on the environment in which they operate. Electric vehicles should ensure their operational parameters are constrained to protect the environment, while also being adjusted for local conditions, or managed to ensure safety of the operator or the vehicle itself. The following discussion describes the work of the inventor and gives rise to electric vehicles (e.g., LSVs, etc.) that are more ecologically sensitive while also retaining economical efficiencies or work-related performance.

SUMMARY

The inventive subject matter provides apparatus, systems, and methods in which an electric vehicle is dynamically configured to have reduced impact on a real-world environment (e.g., forest, golf course, farm, campus, etc.). One example embodiment includes an environmentally low impact electric vehicle, which can comprise a set of sensors, at least one battery, and a vehicular controller. One or more batteries, preferably rechargeable or swappable batteries, provide power to the electric vehicle's various electrical elements. The set of sensors are coupled with the vehicular controller and provide information about the vehicle and the local environment of the vehicle. The sensors may further provide information about the environmental impact the vehicle has been making, if any. Further, the set of sensors can cover a broad range of sensor modalities and can include accelerometers, gyroscopes, inertial measurement units (IMUs), piezoelectric sensors, cameras, LIDAR, radar, GPS, sound detectors, electromagnetic field sensors, wheel speed sensors, steering angle sensors, load sensors, displacement transducers, strain gauges (e.g., on the vehicle's suspension), or other types of sensors. The vehicular controller comprises a computer readable memory and at least one processor and is further coupled with the set of sensors and the batteries for power.

The vehicular controller may be configurable to control the electric vehicle (e.g., adjusting the operational profile, including controlling various drive-by-wire systems to control vehicle motor(s), braking system(s), steering, etc.) to minimize or eliminate residual environmental impacts of the vehicle based on various environmental and/or vehicle information (e.g., determined from sensor data obtained from the set of sensors, provided by an operator, etc.). Such environmental and/or vehicle information may include the geo-location of the vehicle, a locally sensed context, the vehicle's mass, acceleration, and loading (e.g., used to determine a real-time center of gravity and inertia of the vehicle, which may vary based on changes to passenger and/or cargo loading, weight transfer during acceleration or braking, etc.), any other suitable environmental and/or vehicle data, and/or a combination thereof. More specifically, when the processor executes software instructions stored in the memory, the controller performs various operations including obtaining environmental and/or vehicle data, including determining the real-time center of gravity and inertia of the vehicle based on various sensor data (e.g., such as acceleration, vehicle loading, and mass data), obtaining environmental data from various environmental sensors (e.g., electromagnetic field sensors, sound/noise sensors, surface sensors, thermal sensors, cameras etc.) and obtaining location data from at least one location sensor (e.g., GPS, IMU, visual location, etc.). It is noted that in the description provided herein, the term "inertia" may refer to the vehicle's pitch moment of inertia, roll moment of inertia, yaw moment of inertia, polar moment of inertia, or a combination thereof, and may further include an inertial magnitude and/or direction.

The controller's operations may further include receiving at least one operational profile, typically a torque profile, from a profile database where the operational profile is selected based on the environmental and/or vehicle data. For example, the profile database could store operational profiles indexed based on geo-fences or geo-locations and can return such profiles in response to receiving a geo-location query. In another example, the profile database may store operational profiles further indexed based on the vehicle's center of gravity and/or inertia and return such profiles in response to receiving an updated value for the center of gravity and/or inertia of the vehicle in real-time. Additional operations include instantiating a local vehicle context in the memory based on local environment sensor data obtained from the sensors. Preferably, the local context provides a more fine-grained understanding of the environment around the vehicle. Thus, the operations can further include generating a set of operational instructions (e.g., wheel instructions, motor instructions, etc.) based on the operational profile and the local context. In more specific embodiments, a torque profile is adjusted based on the local context and corresponding instructions are generated for the motors driving the wheels of the vehicle. Once the set of operational instructions are generated, the operations can further include executing the instructions to thereby cause the vehicle to take corresponding actions; motors causing the wheels to move according to a torque profile, for example.

The goal is to design and produce zero emission, tailorable, low speed vehicles that serve a plurality of purposes, with a high level of sustainability and safety in every phase of vehicle design and operation. Various techniques and designs are implemented to achieve a vehicle that traverses its chosen environment without disturbing it, damaging it, or leaving minimal residual traces of having been there. For instance, zero emission allows for vehicle use indoors, in highly congested environments, or in any application where emissions may affect the health or productivity of living beings. In an example, the weight of the vehicle is minimized while maximizing the contact patch and unique tire compounding to leave the surfaces traversed undamaged. In another example, payload subsystems of the vehicle are extraordinarily lightweight and highly reconfigurable (e.g., switched from a flatbed to a pickup bed to a boxbed or any suitable variation), allowing for different uses (e.g., resort use during the day, utility use at night, or tailored food deliveries that differ between the breakfast, lunch, and dinner hours). In that example, the controller controls the vehicle according to the different payload subsystem configurations, and their correspondingly different centers of gravity, for minimizing impact to the traversed environment. In yet another example, a controller controls the vehicle (e.g., throttle response, brake response, suspension response, other suitable responses, and/or a combination thereof), for instance based on the vehicle's real-time center of gravity, real-time inertia, and/or other vehicle and environmental data, to minimize impact to the environment (e.g., by eliminating wheel spinning and the associated turf or soft surface disruption). In some cases, the controller further controls the vehicle based on the vehicle's total available traction (e.g., as determined based on the vehicle's mass and the adhesion coefficient between the vehicle's tires and an environmental surface over which the vehicle travels). In some examples, the controller further controls the throttle and brake responses such that an acceleration curve for the vehicle (e.g., for both increasing speed and decreasing speed) has a continuously changing slope. In various examples, controlling the response of the vehicle and its various components in a manner as described above provides for more efficient and safer operation of the vehicle.

Embodiments of the invention are described by the claims that follow the description. Consistent with some embodiments, a system for regulating impact of a vehicle (e.g., such as a low-speed vehicle) on a real-world environment includes an electric motor-generator coupled to one or more wheels of the vehicle, the electric motor-generator configured to supply a motive force to the one or more wheels of the vehicle in a first mode of operation, and configured to supply a regenerative braking force to the one or more wheels of the vehicle in a second mode of operation. In some embodiments, the system further includes a supplemental braking system configured to supply a supplemental braking force to the one or more wheels of the vehicle. Further, in some examples, the system includes a controller coupled to the electric motor-generator and the supplemental braking system. In various embodiments, the controller is configured to control the electric motor-generator and the supplemental braking system to regulate a surface impact on a terrain over which the vehicle travels. For instance, in some examples, the controller is configured to control the electric motor-generator, while in the first mode of operation, to achieve a smooth acceleration profile while increasing a speed of the vehicle to regulate the surface impact as the vehicle travels. Additionally, in some embodiments, the controller is configured to control both the electric motor-generator, while in the second mode of operation, and the supplemental braking system, to achieve a smooth acceleration profile while decreasing the speed of the vehicle to regulate the surface impact as the vehicle travels.

Consistent with other embodiments, a system for regulating impact of a vehicle (e.g., such as a low-speed vehicle) on a real-world environment includes a motor coupled to one or more wheels of the vehicle, the motor configured to supply a motive force to the one or more wheels of the vehicle to increase a speed of the vehicle to inhibit a surface impact on a terrain over which the vehicle travels. In some embodiments, the system further includes a braking system coupled to the one or more wheels of the vehicle, the braking system configured to supply a braking force to the one or more wheels of the vehicle to decrease the speed of the vehicle to inhibit the surface impact on the terrain over which the vehicle travels. Additionally, in some examples, the system includes a controller coupled to the motor and the braking system. In some embodiments, the controller is configured to determine a real-time center of gravity of the vehicle, and the controller is configured to control the speed of the vehicle, based on the real-time center of gravity of the vehicle, to inhibit the surface impact on the terrain over which the vehicle travels.

Consistent with still other embodiments, a method for regulating impact of a vehicle (e.g., such as a low-speed vehicle) on a real-world environment includes providing the vehicle including an electric motor-generator that supplies a motive force while in a first mode of operation and a regenerative braking force while in a second mode of operation, a supplemental braking system that supplies a supplemental braking force, and a controller coupled to the electric motor-generator and the supplemental braking system. In some embodiments, the method further includes retrieving, by the controller, sensor data from a plurality of sensors coupled to the vehicle. Additionally, in some embodiments, the method further includes determining, by the controller, a first real-time center of gravity of the vehicle based on the retrieved sensor data. In some examples, the method further includes based on the first real-time center of gravity, generating, by the controller, an instruction set for traversing an area to inhibit surface impact. Further, in some embodiments, the method includes executing, by the controller, the instruction set to cause the vehicle to modulate a speed of the vehicle while maintaining a smooth acceleration profile.

Consistent with yet other embodiments, a system for regulating impact of a vehicle (e.g., such as a low-speed vehicle) on a real-world environment includes a first electric motor coupled to a steering actuator, the steering actuator coupled to one or more wheels of the vehicle, and the first electric motor configured to engage the steering actuator to steer the vehicle, by turning of the one or more wheels of the vehicle to a turning angle, while maintaining a smooth turning profile to regulate a surface impact on a terrain over which the vehicle travels. In some embodiments, the system further includes a plurality of sensors coupled to the vehicle and configured to provide sensor data. Additionally, in some embodiments, the system further includes a vehicular controller coupled to the first electric motor and the plurality of sensors coupled to the vehicle. In some examples, the vehicular controller is configured to determine a real-time center of gravity of the vehicle based on the sensor data provided by the plurality of sensors, and the vehicular controller is configured to control the turning angle of the one or more wheels of the vehicle, based on the real-time center of gravity of the vehicle, to regulate the surface impact on the terrain over which the vehicle travels.

Various objects, features, aspects, and advantages of the inventive subject matter will become more apparent from the following detailed description of preferred embodiments, along with the accompanying drawing figures in which like numerals represent like components.

BRIEF DESCRIPTION OF THE DRAWINGS

FIG. 10 is a flowchart of an example method for providing and controlling an electric vehicle to regulate surface impact on an area of terrain over which the electric vehicle travels according to some embodiments.

DETAILED DESCRIPTION

Figure 1:
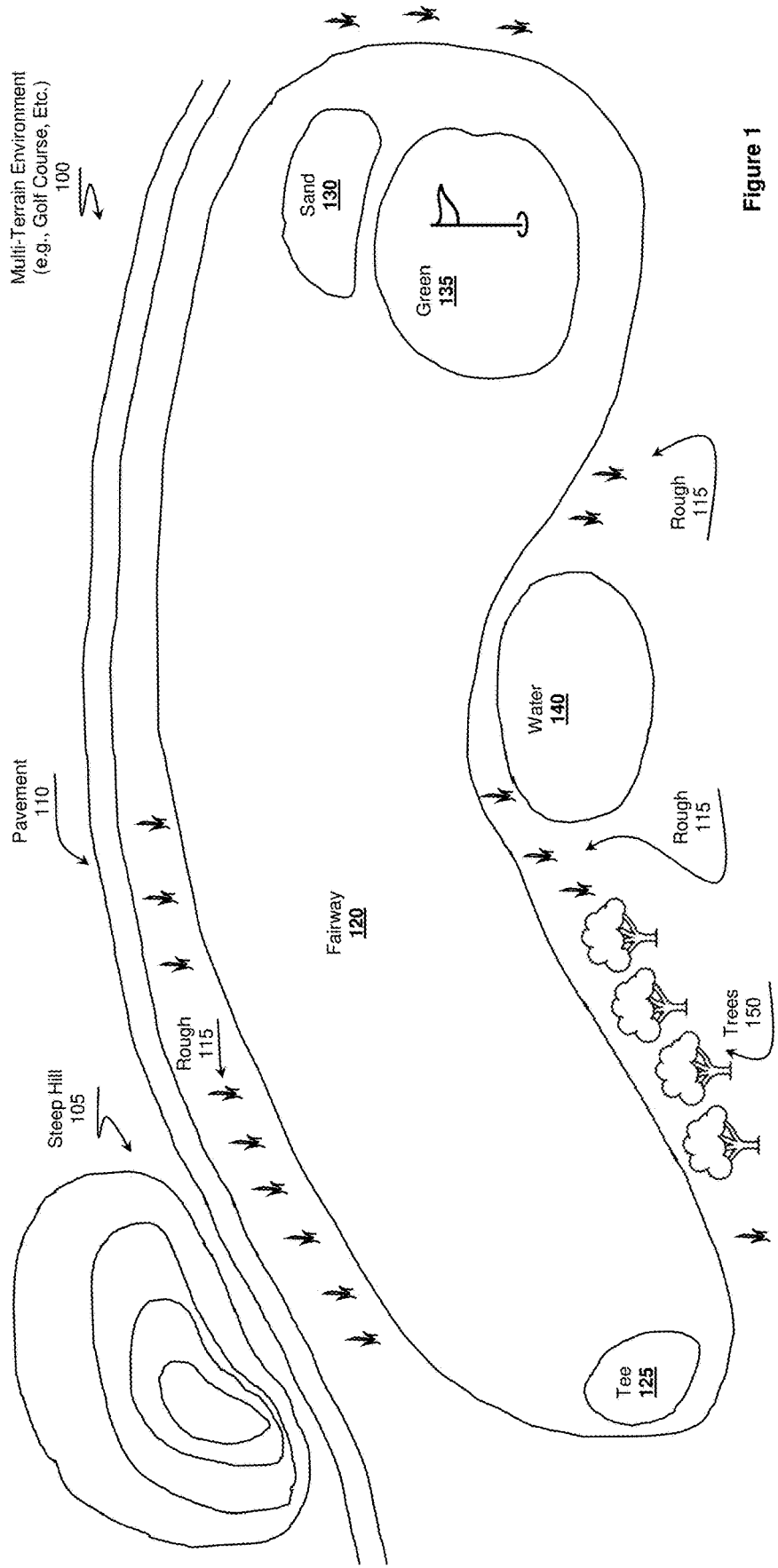
FIG. 1 provides a schematic of an example environment with different types of terrain according to some embodiments.

It should be noted that any language directed to a computer or computing device (e.g., a controller, etc.) should be read to include any suitable combination of computing devices, including servers, interfaces, systems, databases, agents, peers, engines, controllers, modules, or other types of computing devices operating individually or collectively. One should appreciate the computing devices comprise a processor configured to execute software instructions stored on a tangible, non-transitory computer readable storage medium or memory (e.g., hard drive, field-programmable gate array (FPGA), programmable logic array (PLA), solid state drive (SSD), random-access memory (RAM), flash, read-only memory (ROM), etc.). The software instructions configure or program the computing device to provide the roles, responsibilities, or other functionality as discussed below with respect to the disclosed apparatus. Further, the disclosed technologies can be embodied as a computer program product that includes a non-transitory computer readable medium storing the software instructions that causes a processor to execute the disclosed steps associated with implementations of computer-based algorithms, processes, methods, or other instructions. In some embodiments, the various servers, systems, databases, or interfaces exchange data using standardized protocols or algorithms, possibly based on Hypertext Transfer Protocol (HTTP), Hypertext Transfer Protocol Secure (HTTPS), Advanced Encryption Standard (AES), public-private key exchanges, web service application programming interfaces (APIs), known financial transaction protocols, or other electronic information exchanging methods. Data exchanges among devices can be conducted over a packet-switched network, the Internet, local area network (LAN), wide area network (WAN), virtual private network (VPN), or other type of packet switched network; a circuit switched network; cell switched network; or other type of network.

As used in the description herein and throughout the claims that follow, when a system, engine, server, device, module, or other computing element is described as configured to perform or execute functions on data in a memory, the meaning of "configured to" or "programmed to" is defined as one or more processors or cores of the computing element being programmed by a set of software instructions stored in the memory of the computing element, or otherwise accessible by the computing element, to execute the set of functions on target data or data objects stored in the memory.

The inventive subject matter provides apparatus, systems, and methods in which an electric vehicle is dynamically configured to have reduced impact on a real-world environment (e.g., forest, golf course, farm, campus, etc.). One example embodiment includes an environmentally low impact electric vehicle, which can comprise a set of sensors, at least one battery, and a vehicular controller. One or more batteries, preferably rechargeable or swappable batteries, provide power to the electric vehicle's various electrical elements. The set of sensors are coupled with the vehicular controller and provide information about the vehicle and the local environment of the vehicle. Further, the set of sensors can cover a broad range of sensor modalities and can include accelerometers, gyroscopes, inertial measurement units (IMUs), piezoelectric sensors, cameras, LIDAR, radar, GPS, sound detectors, electromagnetic field sensors, wheel speed sensors, steering angle sensors, load sensors, displacement transducers, strain gauges (e.g., on the vehicle's suspension), or other types of sensors. The vehicular controller comprises a computer readable memory and at least one processor and is further coupled with the set of sensors and the batteries for power. The vehicular controller is configurable to adjust the operational profile of the electric vehicle, and including various drive-by-wire systems such as throttle systems, braking systems, and steering systems, based on the geo-location of the vehicle, a locally sensed context determined from sensor data obtained from the set of sensors, and/or the vehicle's mass, acceleration, and loading (e.g., used to determine a real-time center of gravity and inertia of the vehicle) also determined from sensor data obtained from the set of sensors. More specifically, when the processor executes software instructions stored in the memory, the controller performs various operations including determining the real-time center of gravity of the vehicle, based on various sensor data (e.g., such as acceleration, vehicle loading, and mass data), from which the controller can operate to control vehicle speed and acceleration, among other vehicle components. The controller's operations further include obtaining location data from at least one location sensor (e.g., GPS, IMU, visual location, etc.). The controller's operations further include receiving at least one operational profile, typically a torque profile, from a profile database where the operational profile is selected based on the location data and/or on vehicle data (e.g., such as the real-time center of gravity of the vehicle). For example, the profile database could store operational profiles indexed based on geo-fences or geo-locations and can return such profiles in response to receiving a geo-location query. In another example, the profile database may store operational profiles further indexed based on the vehicle's center of gravity and/or inertia and return such profiles in response to receiving an updated value for the center of gravity and/or inertia of the vehicle in real-time. Additional operations include instantiating a local vehicle context in the memory based on local environment sensor data obtained from the sensors. Preferably, the local context provides a more fine-grained understanding of the environment around the vehicle. Thus, the operations can further include generating a set of operational instructions (e.g., wheel instructions, motor instructions, etc.) based on the operational profile and the local context. In more specific embodiments, a torque profile is adjusted based on the local context and corresponding instructions are generated for the motors driving the wheels of the vehicle. Once the set of operational instructions are generated, the operations can further include executing the instructions to thereby cause the vehicle to take corresponding actions; motors causing the wheels to move according to a torque profile, for example.

The goal is to design and produce zero emission, tailorable, low speed vehicles with minimal environmental impacts that serve a plurality of purposes. Various techniques and designs are implemented to achieve a vehicle that traverses its chosen environment without disturbing it, damaging it, or leaving any residual traces of having been there. For instance, zero emission allows for vehicle use indoors, in highly congested environments, or in any application where emissions may affect the health or productivity of living beings. In an example, the weight of the vehicle is minimized while maximizing the contact patch and unique tire compounding to leave the surfaces traversed undamaged. In another example, payload subsystems of the vehicle are extraordinarily lightweight and highly reconfigurable (e.g., switched from a flatbed to a pickup bed to a boxbed or any suitable variation), allowing for different uses (e.g., resort use during the day, utility use at night, or tailored food deliveries that differ between the breakfast, lunch, and dinner hours). In that example, the controller may control the vehicle according to the different payload subsystem configurations, and their correspondingly different centers of gravity, for minimizing impact to the traversed environment. In yet another example, a controller (e.g., using a processor and software) controls the vehicle (e.g., throttle response, brake response, suspension response, other suitable responses, and/or a combination thereof), for instance based on the vehicle's real-time center of gravity, real-time inertia, and/or other vehicle and environmental data, to minimize impact to the environment (e.g., by eliminating wheel spinning and the associated turf or soft surface disruption). In some cases, the controller further controls the vehicle based on the vehicle's total available traction (e.g., as determined based on the vehicle's mass and the adhesion coefficient between the vehicle's tires and an environmental surface over which the vehicle travels). In some examples, the controller further controls the throttle and brake responses such that an acceleration curve for the vehicle (e.g., for both increasing speed and decreasing speed) has a continuously changing slope. It is noted that for purposes of this discussion, "acceleration" is defined as the rate of change of the velocity (including either increasing speed or decreasing speed); however, in some cases the term "deceleration" may also be used to describe acceleration of a vehicle with decreasing speed. In various examples, controlling the response of the vehicle and its various components in a manner as described above provides for more efficient and safer operation of the vehicle.

As discussed in detail below, the disclosed techniques provide various advantageous technical effects for controlling the vehicle (e.g., dynamically adjusting the operational parameters of the vehicle) to achieve a reduced or negligible impact on the environment while ensuring that the vehicle remains safe. An example advantage is controlling the throttle, braking, suspension, tire pressure, torque profile, etc., of the vehicle based on the vehicle's real-time center of gravity, real-time inertia, the vehicle's total available traction, and/or other vehicle and/or environmental data. For instance, based on the vehicle's total available traction and real-time center of gravity and inertia, braking or motive forces can be selectively applied where needed to one or more wheels of the vehicle to minimize any potential environmental impact while also maintaining safe operation of the vehicle (e.g., such as applying more forces to front wheels during braking and more forces to rear wheels during acceleration, etc.). Another example advantage is controlling the vehicle based on various environmental data (e.g., such as the vehicle's geolocation, its local environment, any other suitable environmental data, and/or a combination thereof) and vehicle configuration (e.g., payload configuration, tire patterns, etc.). For example, control of the throttle, braking, suspension, tire pressure, torque profile, etc., of the vehicle, or of individual wheels of the vehicle, may further be based on a mapping of the vehicle's (or wheel's) precise location to the underlying terrain type, slope, etc., over which the vehicle travels.

The focus of the disclosed inventive subject matter is to enable construction or configuration of a computing device to operate on vast quantities of digital data, beyond the capabilities of a human. Although the digital data may represent a local environment and a vehicle within the local environment, it should be appreciated that the digital data is a representation of one or more digital models of the environment and of the vehicle, not the natural environment itself or the physical vehicle itself. By instantiation of such digital models (e.g., a local vehicle context) in the memory of the computing devices (e.g., vehicular controller), the computing devices can manage the digital data or models in a manner that could provide utility to a user of the computing device that the user would lack without such a tool. Further, the disclosed vehicles can make fine-grained adjustments to their operational parameters based on local conditions and real-time vehicle parameters (e.g., such as center of gravity, inertia, etc.) far faster than a human could.

The following discussion provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

FIG. 1 presents multi-terrain environment 100 in the context of a golf course as a framework to describe the inventive subject matter. While FIG. 1 illustrates environment 100 as a golf course, one should appreciate the disclosed techniques are not so limited. Rather environment 100 could comprise any real-world or physical environment having a spectrum of terrain types. For example, other environments could include college campuses, apartment complexes, amusement parks, military bases, cities, city parks, natural parks, retirement communities, or other types of environments. Regardless, the disclosed electric LSV can be considered to operate in multi-terrain environment 100 in various capacities including operating as one or more of a maintenance vehicle, a refrigeration vehicle, a grounds keeping vehicle, a cargo carrying vehicle, a delivery vehicle, a pleasure vehicle, a personal transport vehicle, a bus, an emergency vehicle, an unmanned vehicle or drone, an autonomous vehicle, a robot, or operate according to other types of service requirements.

The LSV may encounter various types of terrain which can impact the operation of the vehicle. Further, in view of the differences of the terrains, the vehicle can cause a negative impact on the environment. Consider a scenario where the LSV must contend with the terrains in environment 100 and must adjust its operational parameters as the LSV moves in a single terrain or moves from one terrain to another as discussed below.

From a high-level perspective, the disclosed LSVs can adjust their operational parameters using operational profiles stored in a database where the profiles are indexed by relevant geo-location data and/or by the LSV's real-time center of gravity and/or inertia. The LSV, via a vehicular controller, can obtain the operational profile by submitting a location-based query to the database and/or by submitting a vehicle parameter-based query (e.g., center of gravity, inertia, etc.) to the database. Further the LSV can use sensor data from one or more sensors disposed on or about the vehicle to determine a local context. The controller uses the local context to make fine-grained adjustments to the operational profile (e.g., a torque profile as discussed below, etc.) to ensure the LSV has a further optimized performance relative to the impact on the environment. Again, the details of these high-level features will be discussed further below.

Returning to environment 100, consider a scenario where the LSV is operating in a golf course setting, possibly as a grounds-keeping vehicle. A golf course setting was selected for this illustrative example due to the varied terrain and sensitivity of the terrain to repeated use while juxtaposed against the need to keep the terrain in a playable or pleasing state. However, as referenced above, the disclosed issues associated with a golf course can be extrapolated to other settings.

Environment 100 may include one or more hills or other physical features as exemplified by steep hill 105. Hill 105 may have one or more specific features that could impact the operation of the LSV. For example, hill 105 might simply be inaccessible according to an operational profile, thus the vehicle may be restricted or forbidden to operate on hill 105 or forbidden to approach a buffer area around hill 105. Such restrictions may be of use in cases where the vehicle or passengers may be at risk or to protect the natural environment (e.g., flora, fauna, prevent erosion, etc.), possibly in a nature park or nature reserve. Still, hill 105 could also remain accessible, although it might have specific features that must be accounted for; possibly including a steep slope as illustrated by the dense contours of hill 105. In such cases, the operational profile associated with the hill 105 can include commands that ensure the LSV can maintain stability on the slope, or other specific feature, or that also ensure the LSV doesn't damage the slope. More specifically, the LSV could be instructed to adjust tire pressure, suspension configuration (e.g., such as air pressure for an air suspension system), or torque so the wheels of the LSV roll without slipping or could be instructed to restrict movement along specific or defined paths on the slope wherein the paths are known to have the best approach for going up the slope or down the slope. Even further, the operational profiles associated with hill 105 can further include speed or velocity (i.e., speed and direction) restrictions on or around hill 105. In at least some examples, the operational profiles may include throttle and/or braking control based on real-time variations in center of gravity and/or inertia of the LSV (e.g., as in the case of variations in suspension as the LSV traverses the hill 105). One should appreciate that the operational profiles offer multiple advantages including one or more of the following: reduced impact on the environment, increased safety to passengers (e.g., tighten seat belt, reduce tilt, etc.), reduce risk to the vehicle itself and thereby increase cost savings (e.g., reduced maintenance, reduced replacements, reduced insurance costs, etc.), or increased management oversight.

While hill 105 might have operational profiles that result in reduced impact on the terrain in and around hill 105, pavement 110 might have operational profiles that are less restrictive. Pavement 110 can be considered a man-made terrain, for example, that is specifically configured to permit the LSV to traverse an area with ease or without significantly impacting the environment. In the example shown, pavement 110 could include a cart path, but also could include a sidewalk, a street, a tennis court, or other type of prepared surface. For the sake of discussion, the operational profile associated with pavement 110 might be configured to permit LSV to operate at its full operational potential and may therefore not include restrictions. However, it is also possible the operational profile could restrict speeds to acceptable speed limits if desired. Further, it is possible that the operation profile could dynamically adjust throttle and/or braking of the LSV based on real-time variations in center of gravity and/or inertia of the LSV even as the LSV travels over the pavement 110 (e.g., as in the case of shifting loads and/or movement of passengers). In a practical sense, while operating under the operational profile of pavement 110, the LSV could apply full torque from one or more motors to the wheels of the LSV or could achieve highest practical speeds, typically in the 25 mph to 35 mph range for most target use cases. While the disclosed vehicles are LSVs, it should be appreciated that other electric vehicles might not have such restrictions and might be permitted to operate in a higher capacity possibly limited only by their designs (e.g., road legal electric vehicles, electric trucks, drones, autonomous vehicles, boats, etc.).

While pavement 110 is considered paved, other types of vehicle corridors could also be present in environment 100, possibly including dirt roads, gravel roads, trails, or other types of prepared terrains. In such cases, the operational profiles for such prepared corridors can be adjusted accordingly to account for the differences in features. For example, a dirt road or gravel road might have operational profiles similar to pavement 110 but might restrict the torque applied to wheels to prevent rolling with slipping to reduce an amount of dust kicked up or to otherwise reduce the risk of disturbing environment 100. However, once rolling is achieved, the top speeds might not be restricted to permit the LSV to proceed to its destination in a timely fashion. Thus, operational profiles might be required to balance the need for operational goals relative to the desired to have reduced impact on environment 100.

Rough 115 represents yet another type of terrain that may be accounted for when creating operational profiles. While the rough of a golf course might simply include tall grass, it is possible rough 115 might have other attributes that influence corresponding operational profiles. More specifically, rough 115 could include flora or fauna that should be protected while also permitting the LSV to pass through. This gives rise to an interesting feature of the disclosed subject matter where multiple LSVs must be managed in aggregate rather than merely individually. For example, the operational profiles of rough 115 might permit a first LSV to pass through rough 115 along a specified path per unit time (e.g., per hour, per day, per week, per month, etc.), while a second LSV would be restricted from following the same path but would be permitted to traverse rough 115 along a second, different path. Such approaches are advantageous because the LSV retains access to the terrain, but also the terrain is permitted to recover after use. Thus, the operational profiles can be constructed to account for wear-leveling a terrain.

Turning toward fairway 120, fairway 120 can also have yet another set of operational profiles that differ from the other terrains. Fairway 120 is presented as an example of a "natural" (e.g., lawn, grass, etc.) terrain that may be prepared for use, but still should be protected to some degree. In some scenarios, the operational profiles of fairway 120 could also account for wear-leveling. In addition, the operational profiles might include restrictions based on max speed to reduce chances of collisions with other vehicles, people, or wildlife sharing the terrain. Still further, the operational profiles might also include proximity restrictions to simply forbid LSVs from sharing the same physical space, subject to buffer zones as desired. Rolling without slipping via torque control may also be an important feature of the operational profiles for fairway 120 to reduce the risk of the wheels of the LSV ripping the turf. In at least some examples, the operational profiles for fairway 120 may also include throttle and/or braking control based on real-time variations in center of gravity and/or inertia of the LSV (e.g., as in the case of a golfer entering/exiting the vehicle or the golfer loading/unloading a set of golf clubs onto the LSV).

Tee 125 is presented as an example area that may be small or possibly have a relatively high density of people present. In such examples, the corresponding operational profiles may have many of the various features already discussed, but might have further adjustments to account for features of the area. For example, in view that the area might have a high density of people, the operational profile might limit the max speed to ensure the operators have time to react to the people present. Further, the number of vehicles permitted in the area might be restricted. Consider a scenario where the LSV is operating as a golf cart. The operational profiles for tee 125 could restrict the max speed to 2 mph, for example, and only allow two carts on the tee at the same time to account for a single party of golfers to be present on the tee at a time. In view of tee 125 can be considered a small area, restricting the max speed does not necessarily impact the utility of the vehicle in the area as an operator can traverse the area quickly. Further restricting the number of LSVs in the area can also be considered wear leveling.

Sand 130, illustrated as a sand trap, represents yet another type of terrain having interesting features that can be accounted for. Sand 130 could be similar in nature to the dirt or gravel roads mentioned above where the material of the terrain is loose, which may require the operational profiles to ensure the LSV moves by rolling without slipping as governed by a corresponding torque profile. Beyond controlling the wheel movements relative to the terrain, the operational profile could also include instructions to adjust other features of the LSV. For example, in some embodiments, the operational profile could also adjust the tire pressure of the LSV. As the LSV enters the area of sand 130, the LSV could reduce the tire pressure of the LSV's tires so that the tires have better traction while also operating under a rolling without slipping torque profile. In addition to or alternatively, as the LSV leaves the area of sand 130, the tire pressure could be increased to ensure the LSV, assuming the LSV is provisioned with self-inflating tires and/or corresponding pumps, operates with improved efficiency on the new terrain (e.g., fairway 120, pavement 110, etc.). In some examples, as each tire of the LSV enters or leaves the area of sand 130, the tire pressure of the specific tire that has crossed over into the new terrain can be reduced or increased independently of the other tires. Thus, one should appreciate the operational profiles can comprise features beyond controlling the motors or motion of the wheels of the LSV and can include operational parameters in or about the LSV.

In various embodiments, adjusting operational parameters including tire pressure also gives rise to purpose-built equipment that can be quite complementary to the disclosed inventive subject matter. To continue with the tire pressure example, altering the tire pressure to suit the environment can also impact the features of the tire itself beyond just the pressure itself. For example, changing the pressure could also change the shape of the tire to suit the environment. With respect to low pressure, tires such as System 3 Off-Road 32×12-15 System 3 Offroad SS360 Sand/Snow Bias Rear Tire would have better performance in snow or sand when the pressure is lower by adapting such tires to change shape or to increase the number of treads or paddles capable of engaging the loose contact surface. From a high-pressure perspective, tires such as Proline 1014613 Sling Shot MX43 Pro-Loc Tires could have fins or wings that expand out as pressure is increased. At even higher pressures, tires can be constructed so that studs (e.g., metal, rubber, etc.) or other features can emerge from between the treads when the pressure is increased beyond a threshold. Thus, the pressure activated studded tires for the LSV would provide further traction, possibly on slippery, wet, snowy, or icy surfaces. An example of such a tire that could be suitably adapted for such a purpose includes the CST Sandblast Rear Tire 32×12-15 (15 Paddle) for Polaris RANGER RZR XP TURBO S 2018. Thus, the inventive subject matter is considered to include adapting tires, or other elements of the LSV, to be responsive or complementary to adjusting the operational parameters of the LSV due to the local environment and real-time vehicle parameters (e.g., such as center of gravity, inertia, etc.).

While sand 130 may also have operational profiles similar to those discussed above including area restrictions or limitations, rolling without slipping instructions, speed restrictions, or other features, the nature of sand 130 could vary dramatically based on local or temporal conditions. For example, sand 130 might be dry, which may require speed or torque control as discussed above to reduce rolling without slipping. However, sand 130 may also be wet, possibly after maintenance or rain. In which case, the sand 130 may behave more like pavement 110 with respect to the performance of the LSV. The varied nature of the terrain under various local or temporal conditions give rise to the need for more fine-grained control as discussed further below.

Green 135 could be considered similar to fairway 120 or tee 125. However, green 135 represents an area that requires a high degree of care or expense to keep the area in a pristine state. Thus, green 135 could comprise operational profiles that simply exclude LSVs from entering the area. However, green 135 might also include operational profiles that function based on the nature of the LSV. Said differently, the attributes of the LSV may be used to determine which operational profile should be used in conjunction with the area. For example, if the LSV is a golf cart, the operational profile may simply exclude the LSV from entering the area. However, if the LSV is a grounds-keeping vehicle, the LSV may be permitted to enter the area with reduce tire pressure to increase the contact surface area of the wheels to thereby reduce the pressure of the vehicle on the terrain and reduce the impressions made in the terrain. In some embodiments, the LSV could be a lawn mower used to maintain the area.

Water 140, similar to sand 130, is illustrated as a hazard. In the golf course context, a LSV would be restricted from approaching water 140 to closely. However, it is also contemplated that other types of vehicles (e.g., drones, autonomous vehicles, lawn mowers, boats, etc.) might be permitted to approach the area in and around water 140. Additionally, water 140 also provides an illustrative example of an area having features not yet discussed. More specifically, the area around water 140 could comprise a flood plain, which may become critical during or after rain. For example, during or after rain the features around water 140 or other terrains around environment 100, might change due to flooding; for example, overflowing creeks and bridges could become impassible, or experience other changes. In which case, the LSV could alter the restriction requirement of the operational profiles to further restrict the LSV from entering the area. Alternatively, if water 140 could be covered in ice, in which case water 140 could have a corresponding operational profile permitting the LSV to operate on the ice. If emergency conditions exist, the operational profiles could include instructions that define permitted paths to safety. Still further, water 140 could have other conditions that could be important to one or more vehicles. Other local conditions could include waves, choppiness, water depths, or other conditions. Examples of water 140 could include a pond, water hazard, lake, ocean, beach, river, creek, stream, pool, or other type of body of water.

Trees 150 are also presented as an additional terrain having interesting features. Trees 150 represents an area that may be passable by LSV, but could have tight spaces which could cause maneuvering to be difficult. In such cases, the operational profile for the terrain of trees 150 may restrict the speed of LSV to reduce risk of impact with one or more trees. Further, having reduced speed, possibly rolling without slipping, will have a reduced impact of the natural environment around the trees. Additionally, in view that the spaces where the LSV may operate safely are difficult to find, the corresponding operational profiles can include one or more pre-programmed paths that permit the operator to navigate the environment. Additional examples of restrictions that could apply in and around trees 150 include restricting turn radius, preventing the LSV from going in reverse, permitting only service vehicles, permitting only authorized operators in the area, or other features.

While environment 100 is mainly shown as a static environment, one should appreciate that environment 100 could be quite dynamic as alluded to above. Thus, the shapes or features of environment 100 could change with time, weather conditions, natural events, man-made events, or other factors. Consider a case where the weather changes from clear to rainy. Pavement 110 might exhibit a significant change in friction, shifting from a from dry, high friction terrain to a wet, low friction terrain, thereby changing the vehicle's total available traction. Thus, the corresponding operational profile might need to be updated. Alternatively, more than one operational profile could be obtained from which the LSV selects the most appropriate.

Figure 2:
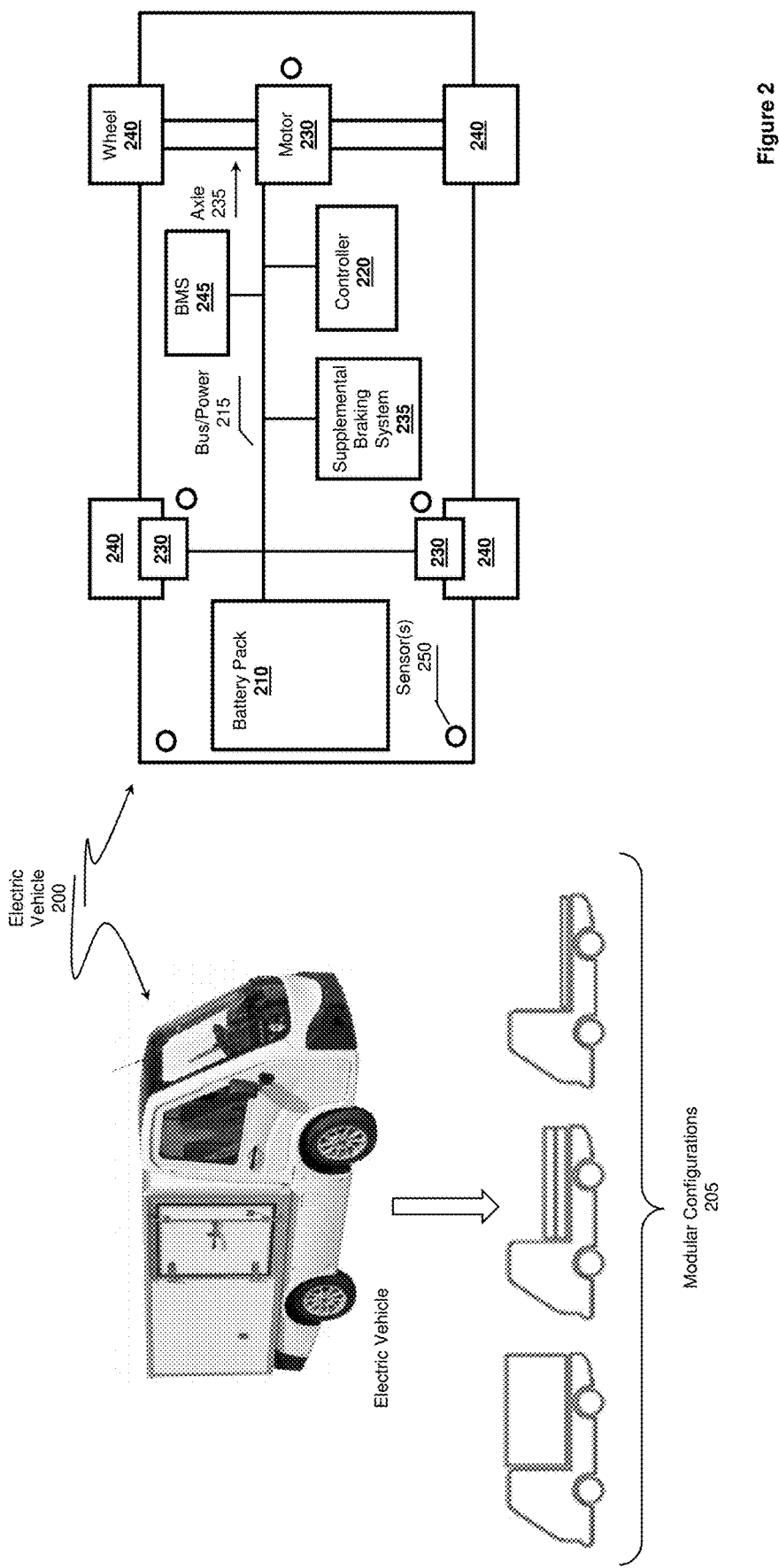
FIG. 2 illustrates an example electric vehicle according to some embodiments.

Environment 100 is illustrated as a single hole of a golf course. Still, one should appreciate the target working environment of an LSV could vary in size, dimensions, elevation, or other factors. For example, environment 100 could be defined based on political boundaries (e.g., zip codes, cities, etc.), geo-fenced boundaries, S2 cells, or other types of boundaries where the encompassed area could include a single type of terrain to many types of terrains (e.g., 2, 5, 10, 100, or more terrains). Of particular note, environment 100 could comprise a larger number of neighboring terrains similar to the terrains in environment 100. In such cases, the operational profiles can include rules or instructions by which the LSV should shift from deployment of one operational profile to another. Such transition rules can be considered to form an impedance match between terrains, which could include acceleration/deceleration instructions that increase or decrease the speed of the LSV according to an acceleration curve having a continuously changing slope, tire pressure changes, or other types of shifts in the operational profiles.

Where FIG. 1 presents a high-level overview of a potential operating environment for and LSV, FIG. 2 provides a more detailed discussion of an LSV. LSV 200 represents an acceptable electric low speed vehicle embodiment for use with the disclosed inventive subject matter. Example acceptable LSV 200 includes the Ayro, Inc. Club Car Current (see URL https://ayro.com/411X-legacy/), which is currently on the market at the time of this writing. LSV 200 is illustrated as a four-wheel vehicle. However, any practical number of wheels is also contemplated; two wheels (e.g., cycle configuration), three wheels (e.g., trike, etc.), and so on.

LSV 200 comprises one or more module configurations 205 permitting LSV 200 to change its target purpose. Module configurations 205 can be considered to change the nature of LSV 200, which in turn can change which operational profiles are of most relevance, possibly based on the attributes of LSV 200. For example, in a flatbed configuration LSV 200 could be operating as a grounds keeping vehicle. In which case, LSV 200 may be permitted to operate in natural terrains; lawns, fairways, forest, or other natural terrains for example. However, in a cargo configuration, LSV 200 could be operating in a delivery capacity. In which case, the corresponding operational profiles may permit LSV 200 to operate at higher speeds, but only on paved surfaces. Further, the various module configurations 205, as well as any loading/unloading of the LSV 200 (e.g., loading/unloading groundskeeping equipment, boxes, packages, etc.), may also change the center of gravity of the LSV 200, which in turn can change the operational profile.

In more preferred embodiments LSV 200 operates as a battery-powered electric vehicle. LSV 200 comprises at least one battery as represented by battery pack 210. Battery pack 210 can comprise one or more rechargeable batteries (e.g., Li-ion, Li-polymer, Li-S, etc.). Further, in some embodiments, battery pack 210 could comprise one or more swappable batteries to facilitate getting the LSV 200 back in operation after a battery has drained. LSV 200 further comprises a set of sensors 250 as represented by the small circles in FIG. 2. While sensors 250 are illustrated disposed on or about LSV 200, the inventive subject matter is not so restricted. Rather, sensor 250 could be deployed remotely. Further sensor data could be obtained from any local or remote source (e.g., weather prediction, news events, etc.). Especially preferred sensors include at least one location sensor; a GPS unit for example. Still other types of location sensors could comprise image-based sensors, IMUs, wireless triangulation units, cellular network location units, or other types of location sensors. In other examples, the sensors 250 may include other sensors such as accelerometers, gyroscopes, piezoelectric sensors, cameras, LIDAR, radar, sound detectors, electromagnetic field sensors, wheel speed sensors, steering angle sensors, load sensors, displacement transducers, strain gauges (e.g., on the vehicle's suspension), or other types of sensors. LSV 200 further includes a set of controllable wheels 240 that are mechanically coupled with at least one controllable motor 230, which in turn is electrically coupled with battery pack 210.

LSV 200 presents various configurations of wheels 240 and motors 230 for discussion purposes. In some embodiments, each of wheel 240 could have a dedicated motor 230 (e.g., such as an electric hub motor disposed within the wheels 240) in a manner that permits each wheel 240 to operate individually, but also collectively under instructions of vehicular controller 220. Still, in other embodiments, a single motor 230 could couple to more than one wheel 240. For example, a single motor 230 could couple to an axle of the LSV supporting two or more wheels where motor 230 causes wheels 240 to rotate via a drive train. In a further example, a single motor 230 could couple to two or more axles of the LSV, each of the two or more axles supporting two or more wheels, and where the motor 230 causes the wheels 240 to rotate via a drive train. Thus, it should be appreciated that wheels 240 rotate in response to engagement of one or more of motors 230. In some examples, the motors 230 themselves may comprise an electric motor-generator that provides a motive rotational force in a first mode of operation, and charges (e.g., supplying electric energy to) the battery pack 210 by regenerative braking in a second mode of operation. In some cases, the controller 220 may control the brake response for the electric motor-generator, for example while in the second mode of operation, to achieve between about 60-70% energy regeneration by the regenerative braking force. In other examples, the LSV 200 may also include a supplemental braking system 235, which may include a friction braking system such as an electrohydraulic or electromechanical braking system, an eddy current braking system, or other type of supplemental braking system that is coupled with the controller 220 and to one or more of the wheels 240, and which may be used separately from or in conjunction with the regenerative braking of the electric motor-generator(s). In various examples, the LSV 200 may further include a battery management system (BMS) 245 that is coupled at least to the controller 220 and the battery pack 210. The BMS 245 may be configured to maintain a desired state of charge (SOC) of the battery pack 210 while the LSV 200 travels. In some cases, the BMS 245 may be implemented as part of the controller 220. LSV 200 further comprises one or more vehicular controllers 220, which provide instructions to motors 230 or wheels 240 as well as governs other systems and/or operational parameters of LSV 200.

Figure 3:
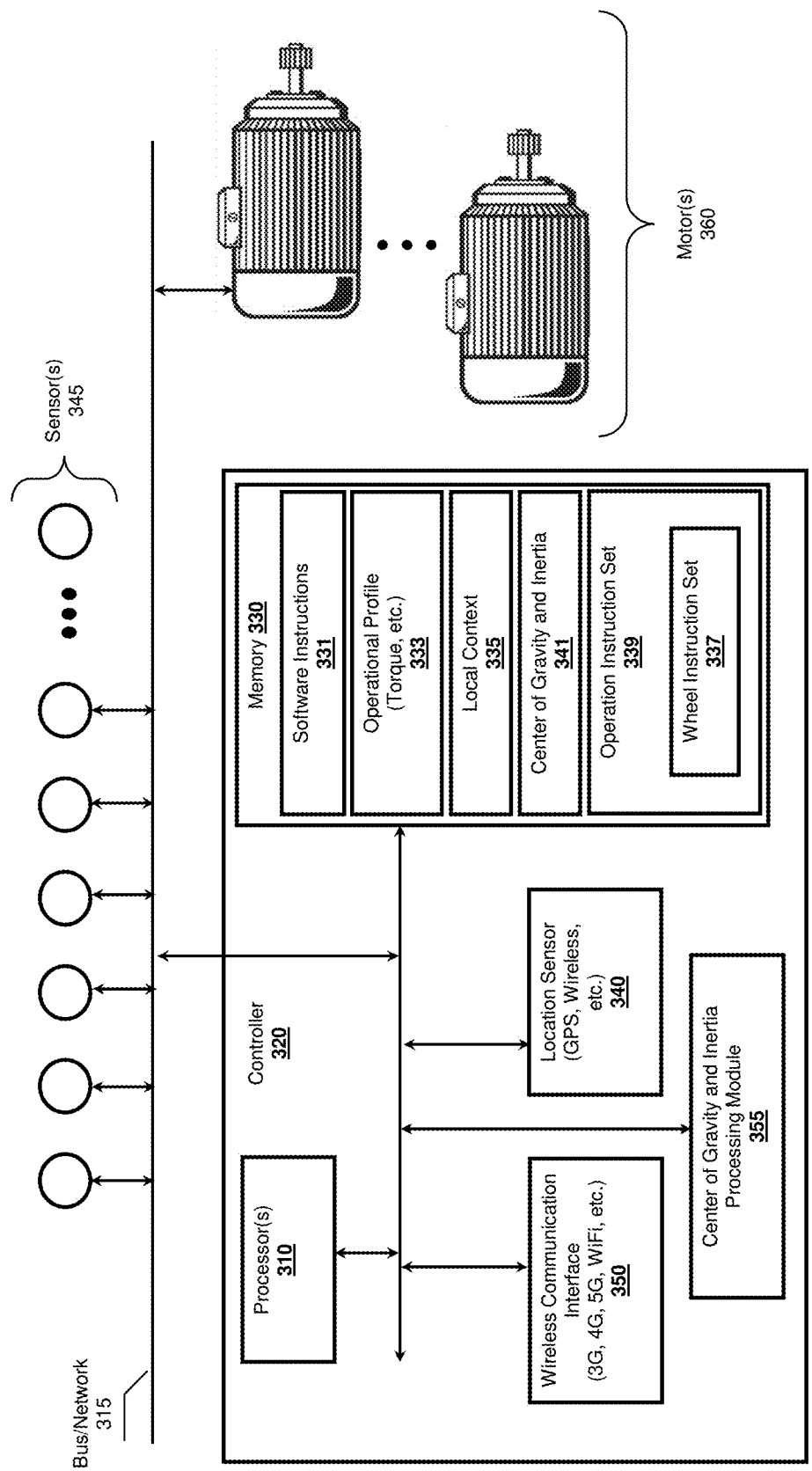
FIG. 3 illustrates an example computer-based controller for an electric vehicle according to some embodiments.

FIG. 3 provides additional information regarding an exemplary vehicular controller of contemplated LSVs. Controller 320 comprises a computing device having at least one computer readable memory 330 (e.g., RAM, ROM, flash, SSD, hard disk drive (HDD), etc.) storing software instructions 331 that configure the controller to take the actions described herein. Controller 320 further comprises one or more processors 310 that execute the software instructions 331. In some embodiments, controller 320 could comprise one or more off the shelf single board computers (e.g., Raspberry Pi, Arduino, PC-104, etc.) or a dedicated computing device. Controller 320 further communicatively couples to a set of sensors 345, which may be disposed about the LSV. For example, sensors 345 could be coupled with controller 320 via one or more buses or network 315 (e.g., Universal Serial Bus (USB), wireless USB (WUSB), Bluetooth, controller area network (CAN), LAN, WiFi, etc.). Further, controller 320 can couple with one or more of motors 360, which in turn couple with the wheels of the LSV. As controller 320 executes its actions it can instruct or control motors 360 to take corresponding actions (e.g., increase torque, turn on, turn off, decrease torque, forward, reverse, etc.). While motors 360 are illustrated as coupling with vehicular controller 320 over bus/network 315, motors 360 could couple to controller 320 over a separate connection or could couple via individual connections. For example, motors 360 could couple directly to controller 320 via connectors (e.g., pulse-width modulation (PWM), etc.) while power is supplied from the battery pack of the LSV.

Sensors 345 represent a broad spectrum of sensors capable of providing sensor data to controller 320 where the sensor data reflects the local conditions of the LSV or provides information related to the LSV. Example sensors include, but are not necessarily limited to, one or more of the following sensors: an accelerometer, a gyroscope, a magnetometer, a piezoelectric sensor, a microphone, a camera, a fluid sensor, an optic sensor, a hall effect sensor, a capacitance sensor, a resistivity sensor, a proximity sensor, a radio detection and ranging (RADAR) sensor, a light detection and ranging (LIDAR) sensor, turning or turning radius sensor, tilt sensor, wheel speed sensors, load sensors, displacement transducers, strain gauges, or other type of sensor. Although the plurality of sensors 345 are illustrated, in general, as being disposed on, in, or about the LSV, in some embodiments, one or more of sensors 345 could be a remote sensor or a remote source of sensor data. For example, a remote source of sensor data could comprise a web service that provides weather information or weather predictions. Further, the sensors 345 could be active or passive. Active sensors can continuously provide sensor input to controller 320 while a passive sensor might only provide input to controller 320 upon request.

As can be appreciated from the broad spectrum of possible sensors 345, the corresponding sensor data can cover a broad spectrum of data modalities. Said in a different way, the sensor data can represent a wide variety of local conditions or information related to the LSV. In some examples, controller 320 can compile the sensor data, which may be a direct measure of the local environment (e.g., a temperature, a pressure, etc.) or may be an indirect measure of the local environment (e.g., a resistance, a capacitance, etc.), into local environment data reflecting the local conditions in which the LSV is currently operating or might be operating in the near future as it moves about the environment or as time changes. In other examples, the compiled sensor data includes data that the controller 320 can use to determine a real-time center of gravity and/or inertia of the LSV.

Example types of local environmental data and LSV data can include, but is not limited to, weather data, precipitation data, friction data, temperature data, time data, audio data, image data, pressure data, tilt data, weight data, acceleration data, mass data, vehicle loading data, displacement transducer data, strain gauge data, video data, image data, or other type of data about the environment or the LSV.

Location sensor 340 is explicitly called out as it has a special purpose with respect to the disclosed subject matter. Location sensor 340 provides controller 320 location data associated with the LSV. Typically, the location data comprises a current location of the LSV in the operating environment. However, it some embodiments, controller 320 can calculate a possible future location of the LSV by deriving one or more predicted values based on the movement, speed, acceleration, direction, or other movement attributes of the LSV. More preferred location sensors 340 can include a Global Positioning System (GPS) unit. However, other types of sensors can also be leveraged to determine a location of the LSV in the environment. For example, the LSV could use image data or video data to determine its location via one or more implementations of image processing algorithms (e.g., simultaneous localization and mapping (SLAM), visual SLAM (vSLAM), neural networks, etc.) or recognition algorithms (e.g., QR codes, bar codes, markers, optical character recognition (OCR), etc.) where the environment has been provisioned with recognizable markers. Still further, the LSV could leverage wireless triangulation to determine its location based on one or more wireless transmitters (e.g., cell towers, beacons, etc.).

While location sensor is illustrated as being deployed on controller 320 or on LSV, in some embodiments location sensor 340 could be remote as well. In such cases, the location data from location sensor 340 could be obtained by controller 320 over a network possibly via wireless communication interface 350. More specifically, an environment could leverage locally deployed cameras (e.g., security cameras, etc.), which can provide a video feed to a central server, which reports on an observed location of the LSV.

The location data associated with the LSV could take on different forms. In some embodiments, the location data could comprise a local coordinate within the operating environment, possibly an address or a specific local coordinate for the environment's custom coordinate system. Still in other embodiments, the location data could comprise a geo-location representing a wide area location relative to a broader location beyond just the local environment or represent a world-wide geo-location (e.g., longitude, latitude, S2 cell identifier, etc.). Thus, the geo-location could comprise a GPS coordinate or other form of global position coordinate. Regardless, controller 320 leverages the location data to obtain one or more operational profiles for the LSV.

Controller 320 may also include a center of gravity and inertia processing module 355 that can be used to compile sensor data which can be used to determine a real-time center of gravity and/or inertia of the LSV. In some cases, the center of gravity and inertia processing module 355 also performs the computations necessary to determine the center of gravity and inertia of the LSV. In other cases, the center of gravity and inertia processing module 355 may forward the compiled sensor data to the processor 310 for computation and determination of the center of gravity and inertia of the LSV. In various embodiments, the center of gravity and inertia processing module 355 can be used to provide real-time values of the center of gravity and/or inertia of the LSV. The controller 320, in addition to leveraging the location data, may further leverage the real-time values of the center of gravity and/or inertia to obtain the one or more operational profiles for the LSV, or to adjust a previously obtained operational profile.

As previously noted, the controller 320 may determine the LSV's total available traction, for example, based on data from the sensors 345 (e.g., such as mass and the adhesion coefficient between the vehicle's tires and an environmental surface over which the LSV travels) or information derived from the sensors 345 such as the center of gravity and/or inertia. The controller 320, based on the LSV's total available traction and real-time center of gravity and inertia, may then selectively apply braking or motive forces where needed to one or more wheels of the LSV to minimize any potential environmental impact while also maintaining safe operation of the LSV. For instance, as just one example, if braking or motive forces were instead applied to wheels with decreased traction as compared to other wheels of the LSV (e.g., front wheels during acceleration or rear wheels during braking), one or more of the wheels of the LSV may roll with slipping or may skid, which is both dangerous and can cause negative environmental impacts.

Memory 330 stores one or more sets of software instructions 331, which could take on different forms as well. Software instructions 331 could comprise executable binary code, which is compiled from a high-level language (e.g., C, C++, C#, etc.) and downloaded to memory 330, possibly via wireless communication interface 350. Further, software instructions 331 could also be implemented as a script or program from an interpreted language (e.g., python, Java, perl, etc.). In more preferred embodiments software instructions can be replaced, upgraded, modified or otherwise changed in the field via wireless communication interface 350 once suitable permission or security measures are in place.

Beyond software instructions 331, memory 330 can also store other data structures or assets of use by controller 320. More specifically, memory 330 can store one or more of operational profile 333 retrieved from an operational profile database. For example, as the LSV travels around the environment, controller 320 can query the operational profile database using the location data obtained from location sensor 340 and/or using the real-time center of gravity or inertia of the LSV as determined by the center of gravity and inertia processing module 355. In response, controller 320 receives one or more corresponding operational profiles 333 relevant for the location and/or for the current center of gravity or inertia of the LSV. In response, controller 320 instantiates operational profile 333 in memory 330. As the LSV continues to operate in the environment, controller 320 enforces the rules, criteria, conditions, requirements, or other features of operational profile 333. Especially preferred operational profiles comprise a torque profile that governs the behaviors of motors 360 and thereby the contact surfaces of the LSV (e.g., wheels, etc.), which will be discussed in more detail with respect to FIG. 5.

Memory 330 also stores one or more of an instantiated local vehicle context 335. Context 335 represents the local conditions immediately around the LSV, which could be used by controller 320 to adjust the how the LSV operates according to the operational profile 333. Local context 335 comprises information compiled from the environmental data obtained or derived from the sensor data. Local context 335 does not necessarily need to include the actual environmental data, it could include the environmental data for bookkeeping reasons. Still, local context 335 leverages the environmental conditions to determine the fine-grained adjustments to make to operational profile 333.

In some embodiments, local context 335 can be manifested from information stored in operational profile 333. For example, operational profile 333 can include a set of permitted adjustments and corresponding local condition criteria according to which such adjustments are triggered. A permitted adjustment could be represented digitally according to one or more digital formats possibly including Extensible Markup Language (XML), YMAL, JavaScript Object Notation (JSON), binary, script, table, or another digital format. As local conditions are sensed, the corresponding digital representation of the local context 335 can be updated. Additional details of local context 335 will be discussed with respect to FIG. 8.

Memory 330 may also store values of the center of gravity and inertia 341 of the LSV, for example, as determined by the center of gravity and inertia processing module 355. The center of gravity and inertia 341 represents the real-time values of the center of gravity and inertia of the LSV while in motion or while at rest. For purposes of this discussion, the term "real-time" is used to describe values for the center of gravity and inertia which are determined (computed) on a continuous basis and/or values which are updated contemporaneously with an event which causes a change in the center of gravity or inertia (e.g., such as when cargo shifts, when passengers move, etc.). In various examples, the center of gravity and inertia 341 could also be used by controller 320 to adjust the how the LSV operates according to the operational profile 333, thereby providing further fine-grained adjustments to the operational profile 333. In various examples, the values of center of gravity and inertia 341 may comprise information compiled from or derived from the sensor data. While illustrated as a separate element in FIG. 3, in some examples, the center of gravity and inertia 341 may be stored as part of the local context 335. Additional details of center of gravity and inertia 341 will be discussed with respect to FIG. 8 and in relation to local context 335.

Memory 330 further stores wheel instruction set 337, which comprises a set of wheel instructions on how to control the contact surfaces of the LSV via one or more of motors 360. Depending on the nature of the implementation, instructions 337 could comprise high level APIs through which controller 320 generates desired actions or could include low level instructions (e.g., setting values of registers that impact a PWM, etc.) causing motors 360 to take corresponding actions and, again, affecting the contact surfaces (e.g., tires, etc.) of the LSV.

One should appreciate the above discussion refers to the wheels of the LSV, while other forms of contact surfaces or modes of motion are also contemplated. The term "wheel" is used for the sake of discussion and the sake of consistency with respect to the main example use case. However, it should be noted that motors 360 could be coupled with many other forms of locomotion besides wheels depending on the nature of the electric vehicle. For example, in the case of a boat or ship, motors 360 may be coupled with a propeller, an impeller, a fin, a sail, or other forms of water-based locomotion. Further, in the case of an aerial vehicle (e.g., manned vehicle, unmanned vehicle, etc.), motors 360 may be coupled with a propeller, a ducted fan, a wing, a control surface, or other form of aerial control. Thus, wheel instruction set 337 can be generalized and considered to represent a set of instructions targeting motors 360, which in turn operate on controllable elements of the vehicle. Such more generalized instructions are euphemistically represented by operation instruction set 339. Therefore, in some embodiments, wheel instruction set 337 can be considered a subset of operation instruction set 339. Still, operation instruction set 339 can include instructions beyond controlling motors 360, possibly including shifting weight of a payload, controlling tire pressure, controlling suspension, controlling air conditioning, controlling wipers, controlling orientation (e.g., pitch, yaw, roll, angle of attack, etc.), or other type of control.

The elements stored in or otherwise instantiated in memory 330 are not necessarily static data structures but could also comprise dynamic features. Each element, in more preferred embodiments, may be permitted to change in real-time as controller 320 observes its local environment, receives information from a remote server, detects a shift in a cargo load, etc. Therefore, the values in the corresponding data structures could change or the elements could comprise executable codes that could change, possibly including swapping out executable modules, changing which APIs are called, or other forms of changes.

Further the elements stored in memory also provide an initial overview of a flow of operations performed by controller 320. For example, controller 320 is provisioned with one or more of software instructions 331 by which controller 320 functions. Controller 320 obtains location data from location sensor 340 and center of gravity and/or inertia data from the center of gravity and inertia processing module 355, and uses the data to retrieve one or more operational profiles (e.g., a torque profile, etc.) from a profile database. Controller 320 further observes the local conditions via sensors 345 and creates local context 335 based on the environmental data obtained from sensors 345, to provide fine-grained adjustments to one or more of the retrieved operational profiles. Controller 320 also further determines, in real-time, the values of center of gravity and inertia 341, which in some cases may also be used to provide further fine-grained adjustments to one or more of the retrieved operational profiles. Controller 320 could then create operation instruction set 339, including wheel instruction set 337. Controller 320 could then execute the operational instructions, preferably in real time, to enable motors 360 to take corresponding actions (e.g., cause wheels to turn, etc.).

Figure 4:
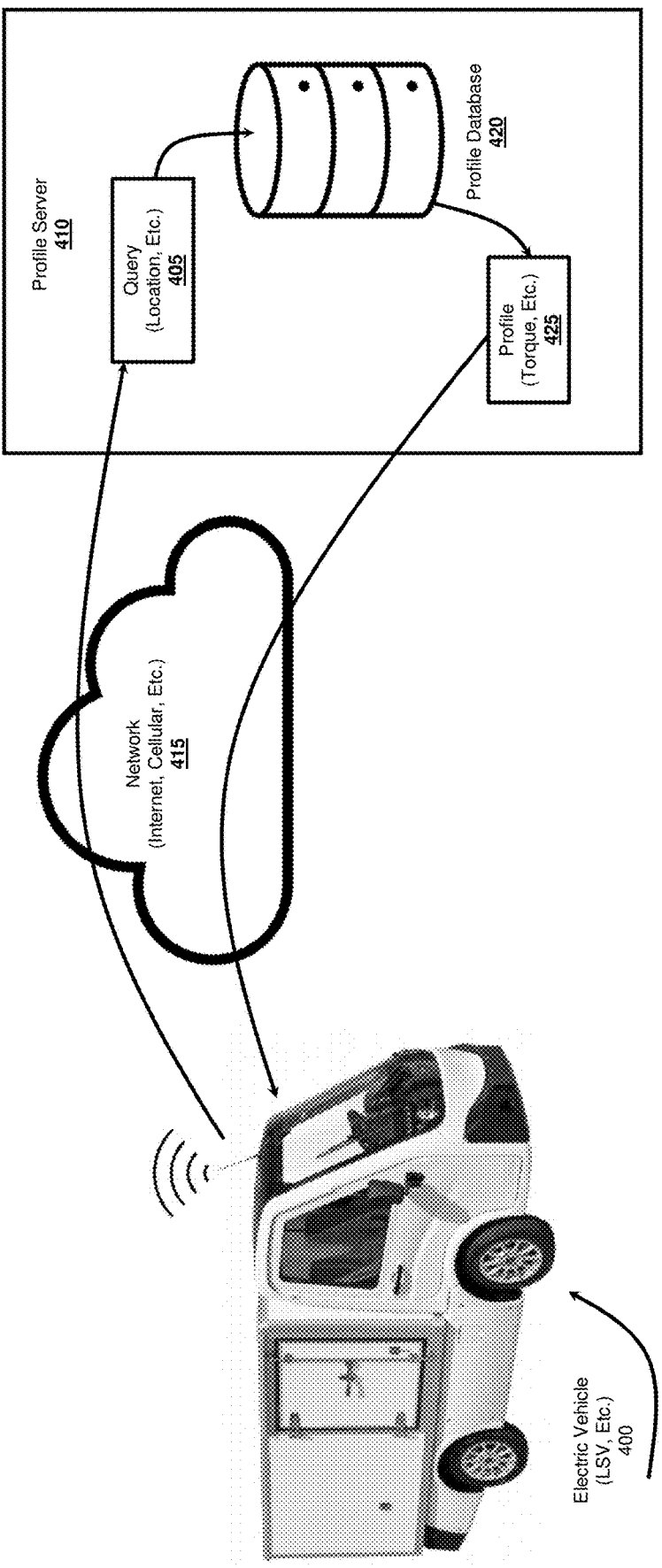
FIG. 4 provides an example method of obtaining an operational profile for an electric vehicle according to some embodiments.

FIG. 4 illustrates a possible approach by which LSV 400 is able to retrieve an operational profile 425 from profile database 420. Operational profile 425 may typically comprises one or more of a torque profile by which the LSV vehicular controller generates commands for the motors of the LSV. Still, operational profile 425 may also include other forms of operational capabilities beyond motor control.

In the example shown, LSV 400 obtains location data from at least one location sensor, where the location data could be digitally encoded in different ways. For example, the location data could comprise geo-location coordinates, addresses, Google Plus codes (see URL maps.google.com/pluscodes), S2 cell identifiers, geo-fence identifiers, zip codes, or other forms of location data. LSV 400 can package the location data as a query targeting the index schema of profile database 420, possibly operating within profile server 410 remotely over network 415. In the example illustrated, LSV 400 generates query 405 and transmits the query over network 415 to profile server 410, possibly over a cellular network. In response, profile server 410 receives query 405 and, assuming authorization or permission is granted to LSV 400, submits a corresponding query to profile database 420. Note, the query submitted to profile database could be an unaltered form of query 405. However, it is also possible server 410 might translate or transform query 405 to a format understandable by profile database 420. Profile database 420 searches for records that have been indexed in a manner that satisfy query 405, especially satisfying the location data requirements in the query. Once one or more records comprising operational profiles 425 have been found, the corresponding operational profiles 425 can be transmitted back to LSV 400 over network 415.

While query 405 could comprise only the location data, it is also possible query 405 could comprise other information about the LSV as well, which may be used to further refine the result set from profile database 420. For example, query 405 could further include the real-time values of the center of gravity and/or inertia, as determined by the center of gravity and inertia processing module 355. This may be advantageous, in one example, when changes to the center of gravity and/or inertia of the LSV occur within an environment or local context that is otherwise substantially uniform but where variations in suspension, shifting loads, passenger movement, loading/unloading of cargo or passengers, etc. necessitate adjustments to, or selection of a subset of, the operational profiles 425 otherwise returned based on location data alone. In another example, the query 405 could further include an identifier of the operator of the LSV, where the identifier can be used to obtain operational profiles to which the operator is permitted to use. Such an approach may be advantageous for insurance reasons, training reasons, safety reasons, or other purposes. Further, query 405 could comprise a set of LSV attributes describing the nature of the LSV's purpose. Example attributes could include a current configuration of the LSV (see modular configurations of FIG. 2), a current purpose of the LSV, an LSV identifier, a date or timestamp (e.g., age of LSV, date of manufacture, etc.), a current condition of the LSV (e.g., battery charge level, wear and tear indications, etc.), or other LSV information. Such additional query conditions, beyond the location data, aid in further refining the result set and thereby controlling the use of LSV 400.

While profile server 410 and profile database 420 are illustrated, more or less, as a cloud-based infrastructure, is should be appreciated that other forms of infrastructure are also possible. For example, LSV 400 could have a local profile repository that could be consulted without requiring communicating over network 415. In such cases, the vehicular controller of LSV 400 could operate as profile server 410 or profile database 420. Such cases are useful when LSV 400 is operating in a single, well-defined environment or operating in remote, unconnected locations. Still further, profile server 410 or profile database 420 could be shared among multiple versions of LSV 400. In which case, each LSV 400 could be a peer in a peer-to-peer network, where each LSV 400 could operate as the server or database for others via a local network (e.g., ad-hoc, P2P, mesh, LAN, WAN, etc.).

Figure 5:
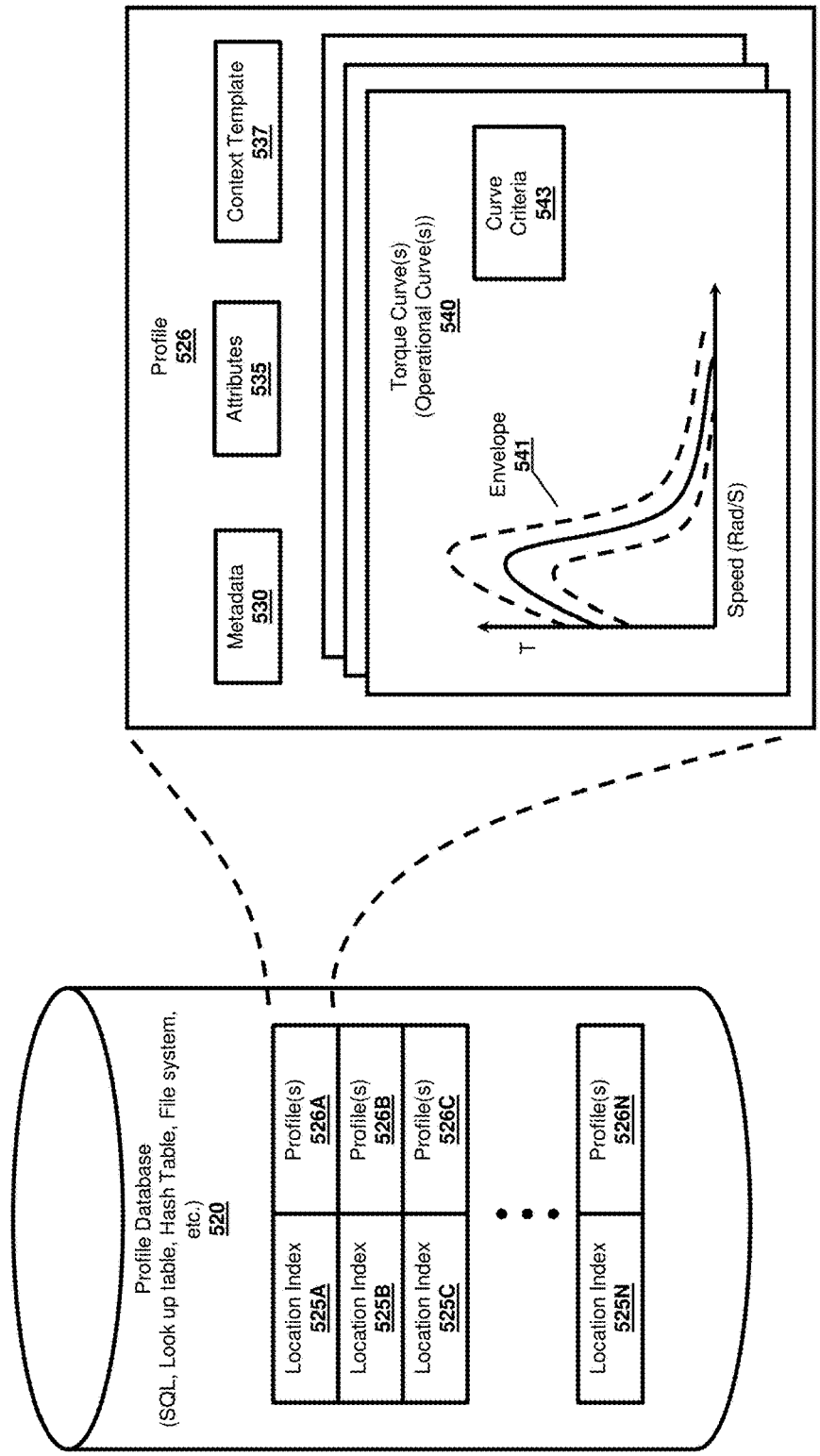
FIG. 5 provides an overview of a profile database and an operational profile for an electric vehicle according to some embodiments.

FIG. 5 presents a more detailed view of operational profiles that can be leveraged by the disclosed LSVs. Profile database 520 represents a data store housing one or more of operational profiles 526A through 526N, collectively referred to as profiles 526. Each profile in profiles 526 is preferably indexed by one or more of location index 525A through 525N, collectively referred to as indices 525. In some examples, however, each profile in profiles 526 may be indexed by vehicle parameters such as the LSV's center of gravity and/or inertia, or by a combination of two or more of location, gravity, and inertia. Profile database 520 can store profiles 526 in many different ways. Still, in more preferred embodiments, each profile of profiles 526 can be retrieved based on a location-based query. Alternatively, or in addition, each profile of profiles 526 can be retrieved based on a vehicle parameter-based query (e.g., center of gravity, inertia, etc.). In one example, profiles 526 can be directly indexed via corresponding coordinates (e.g., longitude, latitude, etc.). Further, indices 525 could represent an indirect set of indices derived from a location coordinate; possibly where a geo-location is converted to a geo-fence identifier and where indices 525 could correspond to geo-fence identifiers. In some embodiments, profile database 520 could operate as a torque profile database where profiles 526 are torque profiles.

In the example shown, each profile has a single index. However, it should be appreciated that a single profile could be indexed via multiple indices where a single profile might be relevant for more than one location or for more than one vehicle parameter (e.g., center of gravity, inertia, etc.). Such use cases are advantageous because it provides for creating a template profile or a default profile that could apply to locations that have common features (e.g., desert, nature park, etc.), or for example, to vehicle parameters for which the profile may be applicable (e.g., such as using the same profile for changes in center of gravity or inertia that are below a given threshold value). In another example, a single profile could be indexed via multiple indices, where the multiple indices include a combination of a location index and a vehicle parameter index (center of gravity, inertia, etc.). Further, a single index could link to more than one profile of profiles 526. Such an approach provides for nested or layered operational profiles for a single location or vehicle parameter (center of gravity, inertia, etc.). Profile database 520 can be implemented via different ways possibly including an SQL database, look-up table, hash table, file system, or other technique providing indexed data. In some embodiments, the profile database 520 may operate in a remote server over a network. However, it is also possible to place or store profile database 520 in the memory of the vehicular controller (e.g., FIG. 2, controller 320's memory 333, etc.).

Beyond location indices 525, or vehicle parameter indices, each of the operational profiles 526 can carry additional information as represented by metadata 530 or attributes 535. Queries targeting profile database 520 may also be formed based on the metadata 530 or attributes 535. Thus, the queries can become more complex than merely comprising location data. In response to more complex queries, database 520 generates a result set of profiles 520 that satisfy the query, including providing profiles having metadata 530 or attributes 535 that satisfy the query. Metadata 530 represents data describing the nature of the data related to the profile (e.g., creation time, data size, data formatting, version number, etc.). Attributes 535 provide additional information related to the overall profile and could include a profile owner, relevant vehicle information (e.g., make, model, year, etc.), target weather conditions, or other information. In some cases, one or more of the vehicle parameters (e.g., center of gravity, inertia, etc.) may be included within the attributes 535. This may be beneficial, for example, when the query targeting the profile database 520 is strictly location-based (e.g., in contrast to a vehicle parameter-based query or a location-based/vehicle parameter-based combination query).

Profile 526, in more interesting embodiments, includes one or more of torque curves 540. Torque curves 540 provide details to the LSV vehicular controller on how to manage the torque of a motor in order to drive one or more wheels of the LSV. Thus, the vehicular controller uses torque curves 540 to determine or otherwise establish commands or instructions submitted to the motors (e.g., setting register values, setting PWM values, etc.). Further, torque curves 540 can also comprise one or more curve criteria 543 by which the LSV vehicular controller determines which curve to use or even which portion of a curve to use. For example, curve criteria could comprise instructions on which of curves 540 to use when raining, what point on the curve to use when starting or stopping the LSV, or which curves 540 or portions of the curves to use for different values of center of gravity or inertia. Yet further, curves 540 can comprise one or more operational envelopes 541 that set a boundary around a corresponding curve. Envelopes 541 may be used to set boundary conditions that should not be exceeded when applying torque to the motors given a set of conditions. While envelope 541 may be used to set restrictions, the restrictions are not required to be on or off but could be based on a spectrum of conditions. For example, envelope 541 may be exceeded based on current conditions (e.g., emergency, weather, etc.).

One should appreciate that torque profiles could apply to different wheel configurations. In some embodiments, a torque profile may only apply to a single motor driving a rear-wheel drive LSV. In some embodiments, a motor can engage a single axle via a reduction drivetrain or transmission (e.g., 13 to 1, etc.). Further a torque profile could apply to a single motor. Thus, for example, a four-wheel vehicle could comprise four hub motors that each drive a single wheel. Such an approach is advantageous because it permits each motor to operate under different profiles, possibly in cases where one set of wheels are on one type of terrain (e.g., grass) while another set of wheels are on a different type of terrain (e.g., sand). Said differently, the torque profiles may apply to a single motor to account for more than one, two, three, or more terrain types. In another example, this approach may be advantageous because it can also permit each motor to operate under different profiles in cases where forces on the vehicle are unevenly distributed (e.g., uneven load distribution, during acceleration where more force is applied to rear wheels, during braking where more force is applied to front wheels, etc.). Therefore, torque profiles may apply to a wheel-by-wheel basis, motor-by-motor basis, axle-by-axle basis, or other practical configurations. Additionally, more than one torque profile may be applicable to a single motor so that two, three, five, 10, or more profiles may be returned from profile database 520.

While torque curve 540 is illustrated as radial speed, in radians per second, versus torque (T), there is no restriction on how the curve can be represented in a digital format. For example, torque curve 540 can further comprise a torque adjustment curve that governs how motors should behave with respect to torque from one point in time to another (e.g., starting torque, stopping torque, accelerating or acceleration torque, decelerating or braking torque, etc.). Such adjustment curves are advantageous especially when local conditions change due to shifts in terrain as the LSV moves from area to area, to changes in center of gravity and/or inertia as loading of the LSV changes or as a result of weight transfer during acceleration or braking, to changing weather conditions, to safety concerns, or other factors. Of note, the adjustment curves can include acceptable torque as a function of time. In such cases, envelope 541 may include restrictions with respect to the rate at which torque is applied or changes. Thus, the torque adjustment curves may include acceptable rates of change in applied torque based on time, or higher derivatives in time (e.g., $2^{nd}$ order derivatives, $3^{rd}$ order derivatives, $4^{th}$ order derivatives, etc.). Such higher order derivatives in time may be used in conjunction with other operational parameters beyond torque as well. One advantage of using higher order derivatives includes smoothing transitions from one state of operation to another state by ensuring the changing operational parameters from state to state have matching or similar values of higher order derivatives at a specific time or during a transition period even as the lower order derivatives change. Interestingly, a path taken mathematically to create a match for higher order derivatives for a specific action (e.g., acceleration, etc.) does not have to be the same, albeit reversed, path taken when performing an opposite action (e.g., deceleration, etc.). Thus, there can be a hysteresis between such paths. Said differently, the ramp down behavior of a set of operational parameters (e.g., speed, etc.) does not have to be the same as the ramp up behavior.

In some embodiments, profile 526 can further include context template 537 representing rules or instructions by which the vehicular controller may adjust the corresponding operational parameters of the LSV. Context template 537 can comprise a set of triggering events that cause specific actions or operational adjustments to take place. One should appreciate that context template 537 might not have actual values for event triggers, but rather one or more sets of criteria by which the events are triggered. More specifically, as the vehicular controller observes the local environment or changes to the center of gravity and/or inertia, as determined via sensor data, the vehicular controller can use the sensor data to determine which triggers should fire or to determine which set of criteria for triggering the event is most relevant at a current instant in time. Context template 537 can be encoded as a markup file, script, or other machine-readable format. Further, context template 537 can be defined in terms of the operational curves (e.g., torque curve 540), especially with respect to envelope 541 to ensure operational parameters do not exceed defined limits. Additional details regarding local contexts, possibly based on one or more of context template 537 are described with respect to FIG. 8.

Although FIG. 5 focuses on torque, one should appreciate profiles 526 can include other operational profiles beyond torque or in addition to torque. In a similar vein, where torque curves 540 apply to the operational parameter of torque, operational profiles can include other types of operational curves as well as the criteria triggering when such operational curves are employed. Thus, operational profiles can include parameters including one or more of the following in addition or alternatively to torque: tire pressure, suspension configuration, battery discharge rate, battery recharge rate, air conditioning use parameters, electrical loading, weight or loading parameters, or other types of operational parameters. As an example, consider tire pressure. In some embodiments, the LSV can be equipped with self-inflating tires. As the LSV traverses various terrains, the vehicular controller can consult an operational profile provisioned with tire pressure parameters and thereby generate one or more instructions to change the pressure of the corresponding tire or wheel. The pressure may be increased to reduce friction to ensure optimal performance on solid surfaces (e.g., pavement, etc.). Additionally, the pressure may be decreased on softer surfaces (e.g., sand, mud, lawn, etc.) to enhance friction for better grip.

Figure 6:
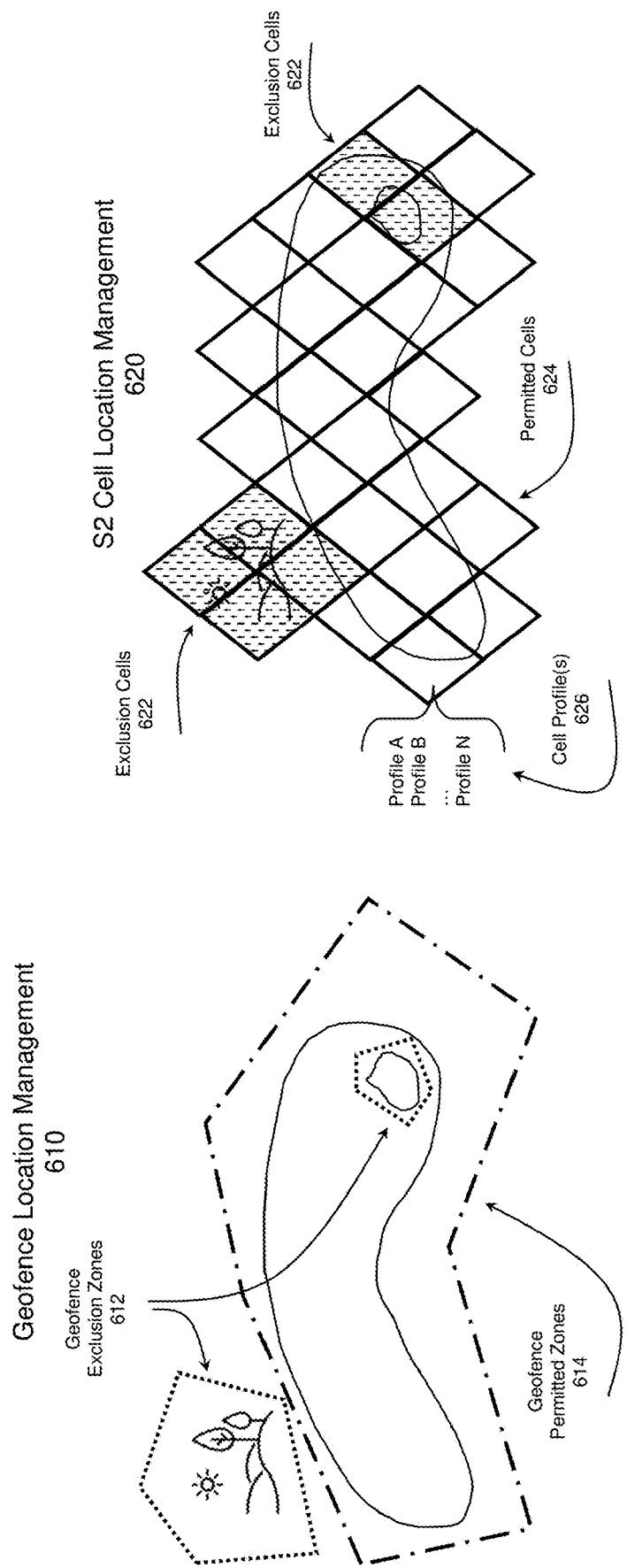
FIG. 6 illustrates example techniques for partitioning an environment based on terrain types according to some embodiments.

FIG. 6 provides an overview of how operational profiles may be used in relation to a geolocation of an LSV. FIG. 6 provides two example use-cases: geolocation fence management 610 and S2 cell location management 620. Starting with a focus on geolocation fence management 610, consider the area as illustrated, a golfing fairway and green similar to environment shown with respect to FIG. 1. As discussed previously, such environments may have multiple terrain types or other environment zones. In the example shown, there are two main zones: a set of geofence exclusion zones 612 and at least one geofence permitted zone 614. As suggested by their names, exclusion zones 612 are constructed to restrict an LSV from entering such zones; say exclude or restrict an LSV from driving on the green or be restricted from operating in the natural area. While it is possible to simply have a NULL set of operational profiles for such zones when the LSV enters the zone, it is also possible to have a set of operational profiles that explicitly provide command infrastructure for the motors, wheels, or other features of the LSV. For example, operational profiles from exclusion zones 612 might include operational adjustment curves that require the LSV to decelerate to zero speed when entering the zone. Further, the corresponding profiles might only permit the LSV to move in a direction toward a closest boundary of the zone to allow the LSV to leave the area, perhaps slowly (e.g., less than 5 mph, etc.) coupled with rolling without slipping. Interestingly, in such situations, the local context becomes more important to further refine how the LSV behaves. More specifically, instructions for the motors, wheels, or other operating features may be refined to account for the orientation of the LSV to determine which directions are forward or backward, to account for safety or emergency considerations, to account for actions taken by the operator, or to account for other factors. Use of geofences provides for course grained control over operational profiles, but also provides for creating well defined boundaries that are more natural to the environment.

Example techniques for managing geofences include those provided by Google® Geofencing API (see URL developers.google.com/location-context/geofencing). From a practical sense, an LSV's location data (e.g., GPS geolocation, observed location, etc.) may be used to identify a specific geofence zone, possibly having a zone identifier. The zone identifier may be used as a geofence query to one or more profile databases to retrieve a result set of relevant operational profiles. As illustrated in the geofence location management example, such zones may be nested, overlap, or otherwise impact each other. In such cases, operational profiles may be given priority values, possibly as an attribute of the profiles, to allow the vehicular controller to determine which profile should take precedence over others (e.g., higher value is high precedence, lower value is high precedence, etc.).

Turning toward S2 cell location management 620, the same environment could be tessellated with area cells as illustrated. S2 cells represent a method by which an area may be partitioned into cells using a Hilbert curve. An advantage of S2 cells is each cell has a unique, well-defined identifier where neighboring cells have similar identifiers due to the nature of the Hilbert curve. This is advantageous because it permits a computer system to use identifiers or portions of the identifiers to find neighboring cells, which in turn, permits the disclosed systems (e.g., see profile database 420 in FIG. 4), to find profiles for a target cell or group of related cells. Example techniques describing S2 cells and identifiers may be found at URLs s2geometry.io and github.com/google/s2geometry.

The cells may overlap or not overlap as desired by the target implementation. In more preferred embodiments, the cells completely cover the target environment as illustrated. Further, in principle large geographic regions (e.g., city, zip codes, counties, states, countries, continents, the entire planet, etc.) could be covered via such cells. In view that each cell has a unique identifier, corresponding operational profiles may be indexed by the cell identifiers, possibly using a hierarchical tree data structure. Thus, queries having an identifier of a course grained cell can return a result set of profiles for more fine-grained cells related to the identifier. Thus, a single cell might return a single profile, multiple cell profiles 626 as illustrated, no profiles, or even profiles from neighboring cells as well as a target cell.

Similar to geofence location management 610, S2 cell location management 620 can include different types of zones, which could impact the nature of the corresponding operational profiles. For example, some cells may be identified as exclusion cells 622, which restrict operation of the LSV as discussed above. Alternatively, cells may be identified as permitted cells 624 where the LSV operation is not restricted or has less restrictions. FIG. 6 presents two types of zones, permitted zones and excluded zones; however, zones may be defined according to any practical schema. Example zone definitions or categories could include maintenance zones, safety zones, grounds-keeping zones, emergency zones, or other types of zones. In such cases, operational profiles could default to the corresponding zone's default profile definition or default template if no a priori defined profiles exist for the target area. Use of S2 cells are advantageous from the perspective of fast memory look-up based on cell identifiers and the ability to tesselate an area. However, S2 cells may be less advantageous because they do not necessarily provide for fine-grained alignment to natural boundaries. Thus, in some embodiments, a hybrid approach of using geofences to define a zone and then using S2 cells to tessellate a zone may be of high value.

There are additional technologies that may be employed for zone management beyond geofencing and S2 cells without departing from the nature of the inventive subject matter. Examples include use of Google® plus codes, which operate somewhat similarly to S2 cells (see URL maps.google.com/pluscodes). Example map management technologies include Google® maps API or Microsoft® Intelligent Maps API, which both offer executable services providing access to maps. Further, OpenStreetMap offers access to a user-created set of map-related services via an open-source model (e.g., see URL www.openstreetmap.org).

As still another example, the LSV may be equipped with a telematics device, such as a Geotab® GO device (e.g., see URL https://www.geotab.com/vehicle-tracking-device/). Leveraging GPS receiver data and on-board diagnostic (OBD) data, as well as any of the plurality of the LSV sensors and other components, the telematics device can collect and process vast amounts of data such as LSV position, speed, trip distance, idling time, acceleration and braking, fuel consumption, battery level, tire pressure, motor data, etc. Such telematics data may be transmitted to a remote server (e.g., such as the profile server 410 of FIG. 4, or to another remote server that is in communication with the profile server 410) and viewed by an end-user, for example, using a vehicle/fleet management software application executing on a computing device (e.g., such as a handheld device, laptop device, tablet, desktop, or other type of computing device). More particularly, the telematics data may be provided to, or is otherwise accessible to, the vehicular controller, such that the controller can retrieve one or more operational profiles based on the telematics data, or make adjustments to a previously selected operational profile based on the telematics data. With respect to zone management, and in some examples, digital cartography data can be overlayed onto the telematics data, including a mapped physical location of the LSV. The digital cartography data may include, for instance, surface type, elevation, slope, ground relief including landforms and terrain, drainage including lakes, rivers, or other bodies of water, forest cover, administrative areas, populated areas, transportation routes and facilities including roads and railways, as well as other natural or man-made features. The vehicular controller, having access to the digital cartography/telematics data either stored locally or accessible via a remote server, can thus provide throttle and/or braking control that is mapped to the characteristics of the terrain over which the LSV travels, thereby providing a further zone management solution. It is noted that the vehicular controller may also, in some cases, modify other aspects of the LSV based on the cartography/telematics data, such as tire pressure, suspension configuration, battery discharge/recharge rate, air conditioning use parameters, electrical loading, weight or loading parameters, or other types of operational parameters of the LSV.

Figure 7:
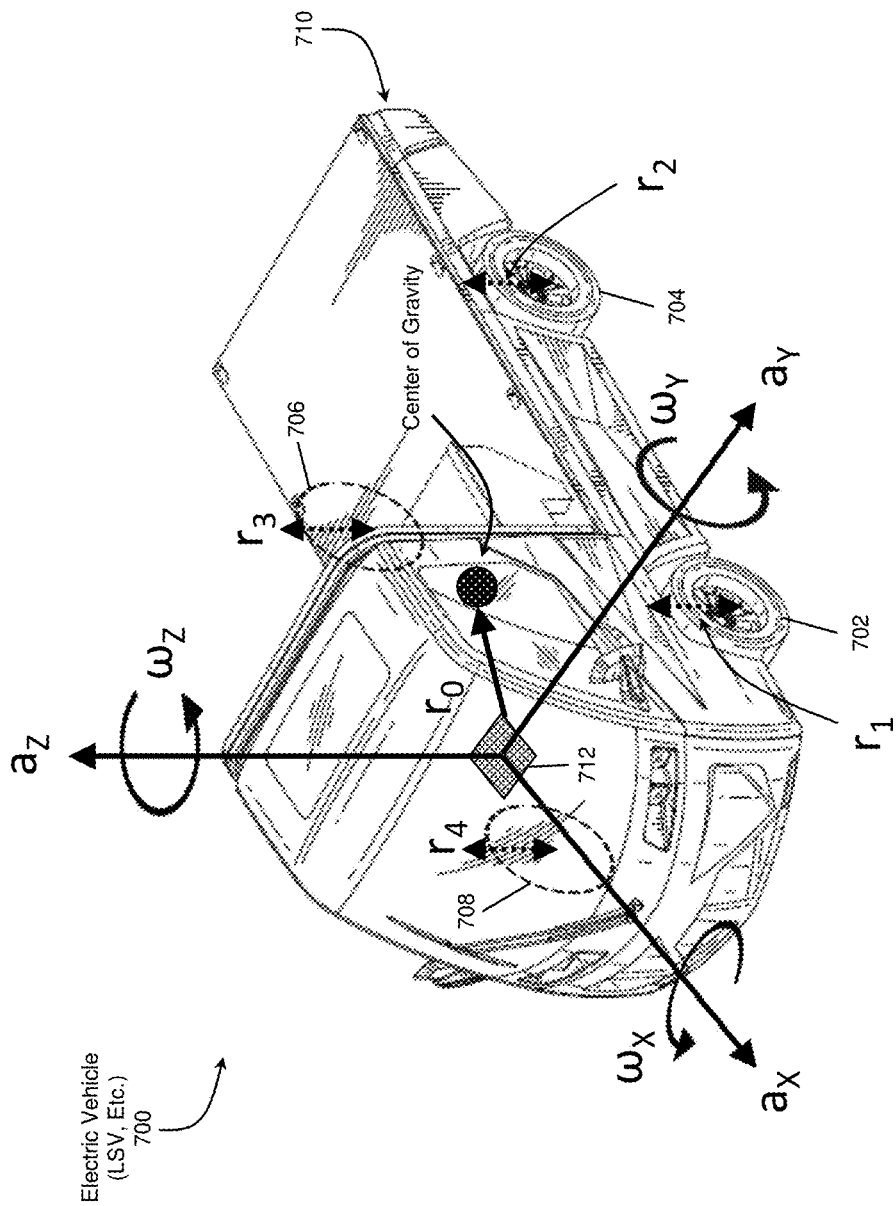
FIG. 7 provides an example of how a real-time center of gravity and/or inertia of an electric vehicle may be determined according to some embodiments.

FIG. 7 provides one example of how the real-time center of gravity and/or inertia of an LSV may be determined, which provides a reference to also discuss how operational profiles may be used in relation to the real time center of gravity and/or inertia. FIG. 7 provides an LSV 700 similar to the LSV 200 shown with respect to FIG. 2. The LSV 700 includes a plurality of wheels 702, 704, 706, 708, a body 710, and a controller 712. In an example, the controller 712 may be the controller 220 or the controller 320, discussed above, which is coupled to a plurality of sensors that may be disposed on, in, or about the LSV 700 or that may be a remote sensor or a remote source of sensor data. As discussed previously, the controller 712 can determine the real-time center of gravity and/or inertia (e.g., FIG. 3, center of gravity and inertia processing module 355), which may vary based on changes to passenger and/or cargo loading, weight transfer during acceleration or braking, etc. For example, the controller 712 may define a measurement point that represents the origin of a coordinate system including an x-axis, a y-axis, and a z-axis. The controller 712 may determine the LSV's acceleration (e.g., $a_x$, $a_y$, $a_z$) and angular rate (e.g., $\omega_x$, $\omega_y$, $\omega_z$) along each of the x-axis, the y-axis, and the z-axis. The acceleration and angular rate can be determined using sensor data, such as from accelerometers, inertial sensors, rotation sensors, etc. As illustrated in FIG. 7, the controller 712 may also determine the displacement between the body 710 and each of the wheels (r), $r_2$, $r_3$, $r_4$), for example which can depend on the kinematics of each wheel's suspension. The controller 712 may use the displacement between the body 710 and each of the wheels and the weight of the LSV 700 to determine a total force acting on the LSV 700. The controller 712 may further determine the mass of the LSV 700 (e.g., prior to operating the LSV 700, or while operating the LSV 700 in a continuous or periodic manner), for example, using the force of gravity and the normal force acting on the LSV 700 based on sensor data received by the controller 712. The controller 712 can then use the LSV's acceleration, angular rate, wheel displacement, and mass to determine the coordinates of the center of gravity. In some embodiments, the controller 712 determines coordinates of the center of gravity based on a coordinate system defined by the physical placement of the controller 712 within the LSV 700, such that the coordinates define a displacement (r0) from the origin (0,0,0) of the coordinate system.

Inertia of the LSV 700 can vary, for example, as the center of gravity changes. As one example, the controller 712 may determine the real-time polar moment of inertia of the LSV 700 by determining a mass distribution of the LSV 700 with respect to a distance from the changing real-time center of gravity of the LSV 700. More generally, the magnitude and direction of inertia along each of the x-axis, the y-axis, and the z-axis (FIG. 7) may be determined or derived by the controller 712 in real-time as the LSV 700 travels, for instance, using sensor data received from any of various types of sensors disposed on, in, or about the LSV 700 (or from a remote sensor or a remote source of sensor data) such as from accelerometers, gyroscopes, inertial sensors, rotation sensors, etc. The sensor data received, or the data derived from the sensor data, and which can be used to determine the magnitude and direction of inertia, may include linear velocity, angular velocity, linear acceleration, angular acceleration, mass, various forces acting on the LSV 700, a distance from an axis of rotation (e.g., such as the center of gravity), etc. Changes to inertia can affect the LSV's responsiveness during operation, thus adjustments to the operational profile can be made based on real-time inertia magnitude and direction, to maintain smooth acceleration, deceleration, turning, and overall handling of the LSV 700.

Regardless of the how the center of gravity and/or inertia are determined however, the controller 712 may retrieve one or more operational profiles based on the real-time center of gravity and/or inertia. In various examples, real-time variations in center of gravity and/or inertia of the LSV 700 may occur due to variations in suspension as the LSV 700 traverses hilly or uneven terrain, shifting loads and/or movement of passengers, passengers entering or exiting the LSV 700, loading or unloading the LSV 700, traveling into or out of different terrain types or environmental zones, etc. As an example, the one or more operational profiles retrieved by the controller 712 may include throttle and/or braking control of one or more of the plurality of wheels 702, 704, 706, 708, while ensuring that the increase or decrease in speed of the LSV 700 proceeds according to an acceleration curve having a continuously changing slope. In some cases, the controller 712 may alternatively or additionally use the real-time values of center of gravity and/or inertia to make fine-grained adjustments to one or more of the operational profiles previously retrieved based on a geolocation of the LSV 700 (FIG. 6) or to make fine-grained adjustments to one or more operational profiles previously retrieved based on the center of gravity and/or inertia.

As previously discussed, the controller 712 may also determine the total available traction of the LSV 700 in real-time, for example, based on or derived from data received from the sensors (e.g., such as mass and the adhesion coefficient between the vehicle's tires and an environmental surface over which the LSV 700 travels). In an example, when the LSV 700 accelerates, the center of gravity shifts such that there is a weight transfer towards the rear of the LSV 700, which increases the available traction at the rear wheels 704, 706 while decreasing the available traction at the front wheels 702, 708. Similarly, when the LSV 700 decelerates, the center of gravity shifts such that there is a weight transfer towards the front of the LSV 700, which increases the available traction at the front wheels 702, 708 while decreasing the available traction at the rear wheels 704, 706. When steering the LSV 700 to turn left or right, the center of gravity shifts such that there is a weight transfer to the outside wheels (e.g., right wheels 706, 708 during a left turn and left wheels 702, 704 during a right turn), which increases the available traction to the outside wheels, and decreases the available traction to the inside wheels. In some cases, the total available traction of the LSV 700 may then be used to make adjustments to the operational profile. For example, the controller 712 may then selectively apply braking or motive forces where needed to one or more of the plurality of wheels 702, 704, 706, 708 (e.g., to the rear wheels 704, 706 when increasing speed and to the front wheels 702, 708 when decreasing speed) to minimize any potential environmental impact while also maintaining safe operation of the LSV 700.

Figure 8:
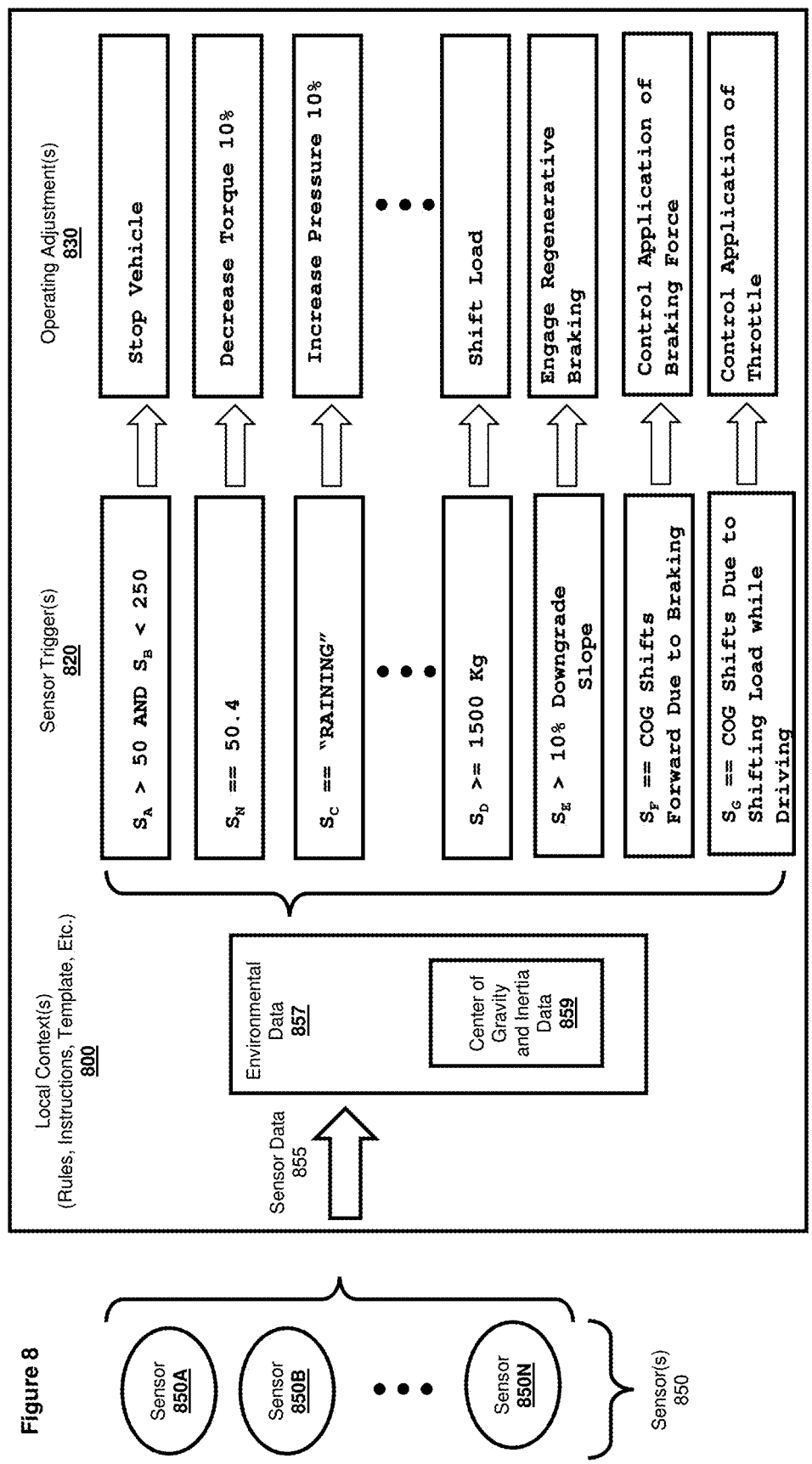
FIG. 8 outlines an example use of a local context for electric vehicle according to some embodiments.

FIG. 8 illustrates a possible approach for use of a local vehicle context 800 to refine actual functionality of an LSV based on an operational profile. Local context 800 can be considered a set of digital local environment data 857 obtained from a set of sensors 850 (e.g., sensors 850A through 850N, etc.) as well as various rules. As the vehicular controller collects sensor data 855 from sensors 850, the vehicular controller builds up, derives, or otherwise compiles the corresponding environmental data 857 for use with local context 800. In the example shown, the environmental data 857 may include center of gravity and inertia data 859 that has been determined by the center of gravity and inertia processing module (see FIG. 3) using the sensor data 855. Thus, as previously discussed, the center of gravity and inertia data 859 may be included as part of the local vehicle context 800. Local vehicle context 800 can take on a broad spectrum of forms. For example, local vehicle context 800 could comprise a base, but empty, template (e.g., XML, YAML, JSON, etc.) found within the corresponding operational profiles where the template has rules, values, code, scripts, or other programmatic features the vehicular controller may use to create a provisioned local context. In the example shown, local vehicle context 800 comprises a set of sensor triggers 820 by which the vehicular controller may (or may not) take action. Sensor triggers 820 are presented to illustrate that environmental data 857 or sensor data 855 can operate based on many different types of data including text values, integer values, derived values, calculated values, floating point values, or other types of values. Further, sensor data 855 and the resulting environmental data 857 (including the center of gravity and inertia data 859), in more preferred embodiments, may be collected in real-time where the vehicular controller can take immediate action based on the observed state of the LSV. As an example of the data flow, sensor data 855 may include a data from a moisture detector, which returns a value of 0 to 255. The corresponding environmental data 857 could simply include the exact same value, possibly as a pass through. However, environmental data 857 could also be the derived value "RAINING" which may be derived by converting the raw value to the derived value via a corresponding conversion function, possibly implemented as a look-up table or as a set of rules.

While the above immediate discussion indicates local context 800 could be a template provided by a corresponding operational profile, one should appreciate that such an implementation is not the only technique for implementing local context 800. In other embodiments, the vehicular controller can have a local context agent (e.g., software, modules, etc.) that executes on the vehicular controller. The local context agent can monitor the local environment conditions and then submit the conditions (e.g., via API, via memory mapped TO, etc.) to an executing profile. The profile itself, also possibly operating as an agent, task, thread, or other set of instructions can then generate appropriate instructions for execution. Thus, local context 800 could be considered as an integral part of an operational profile or could be a distinct set of code from a corresponding operational profile, but yet able to informationally couple with the operational profile. Such communications may also be bi-directional.

As sensor data 855, and the corresponding environmental data 857 (including the center of gravity and inertia data 859), flows into the vehicular controller, the vehicular controller monitors sensor triggers 820, which may operate as listeners. When the vehicular controller determines that one or more of sensor triggers 820 have rules that are satisfied by the local environmental data 857, or other data, the vehicular controller can then generate a corresponding set of instructions (e.g., motor instructions, wheel instructions, operating instructions, etc.) according to the corresponding operational profile as informed by local context 800. For example, one or more operating instructions may be registered with the corresponding listeners for sensor triggers 820. Thus, when the listener has its corresponding criteria satisfied, the instruction can be executed, compiled, submitted to the target device, or otherwise prepared for execution.

In the example shown in FIG. 8, a set of operational instructions are presented as a set of operating adjustments 830. Operating adjustments 830, in addition to being executable commands, can be also considered a set of changes to the operating conditions of the LSV. For example, during operation a tire pressure might be increased in units of 10% per unit time as the LSV transitions from one terrain type (or zone) to another until a desired pressure is achieved. It should be appreciated that the operating adjustments can take on a wide range of possible operating instructions, possibly including a stop instruction, a shift load instruction, an accelerate or decelerate instruction (e.g., increase or decrease torque, etc.), an operator notification instruction, a battery charge instruction, or other type of instruction relating to the operational parameters of the LSV. Still further operating adjustments 830 could leverage regenerative braking, which may be used to recharge the batteries of the LSV. In the example shown, when the vehicular controller detects a downward slope, the controller may automatically engage regenerative braking to control the speed of the vehicle, possibly for safety reasons, and to recharge the batteries. Although the corresponding sensor trigger 820 for regenerative braking is illustrated as a single criterion, any practical number of criterion may be combined to form the trigger (e.g., speed, position, orientation, operator, battery level, etc.).

Recall the LSV can have many different types of configurations where motors impact the performance of one, two, or more wheels. Thus, a set of wheels (e.g., one, two, three, four, or more wheels) can operate individually or collectively based on their corresponding motor or motors. In such cases, the instructions generated by the vehicular controller could comprise different instructions for two different wheels at the same time. Additionally, the different instructions may be representative of two (or more) different terrain types. This is considered advantageous in cases similar to where an LSV might be stuck halfway into a ditch or sand and still be halfway on pavement for example. More specifically, the tire pressure for the sand wheels might be decreased for better grip, while torque on the pavement wheels might be increase because those wheels have more established contact with the surface. Thus, the result can include instructions for the motors to turn the wheels in a manner the promotes rolling without slipping.

In yet other examples, the operating adjustments 830 can be based on the real-time center of gravity and inertia data 859. For instance, when the vehicular controller detects that the center of gravity has shifted forward (e.g., to a front portion of the LSV), as occurs during braking, the controller may generate instructions to apply more braking force to the front wheels as compared to the rear wheels, the front wheels also having more available traction that then rear wheels, while maintaining a smooth acceleration profile (as described in more detail with reference to FIG. 9) and inhibit the surface impact on the terrain over which the LSV travels. Likewise, when the vehicular controller detects that the center of gravity has shifted backwards (e.g., to a rear portion of the LSV), as occurs during acceleration, the controller may generate instructions to apply more throttle (e.g., motive force) to the rear wheels as compared to the front wheels, the rear wheels also having more available traction that the front wheels, while maintaining a smooth acceleration profile. More generally, based on the real-time center of gravity and/or inertia, the vehicular controller may provide instructions to control throttle or braking forces applied to one or more wheels of the LSV in order to control the speed and acceleration of the LSV. In this manner, the acceleration and speed of the LSV is governed by the real-time center of gravity and/or inertia of the LSV. More generally, it is noted that the methods for inhibiting or otherwise regulating the surface impact include features and/or techniques described with regard to FIGS. 9 and 10, as well as elsewhere in this disclosure, and include control based on the real-time center of gravity and/or inertia and the smooth acceleration profile.

In a further example, when the vehicular controller detects a shift in the center of gravity and/or inertia, the controller may increase or decrease the tire pressure of one or more of the wheels in order to increase or decrease the available traction at each wheel to maintain smooth acceleration, for example in some cases as the vehicle travels from one terrain type to another, and thereby inhibit the surface impact on the terrain(s) over which the LSV travels. Similarly, when the vehicular controller detects a shift in the center of gravity and/or inertia, the controller may increase or decrease the air pressure in an air suspension system of the LSV to provide a smooth ride, maintain smooth acceleration over diverse terrains, to raise the body of the LSV for off-road clearance and lower the body for higher-speed driving (e.g., on roads or paved surfaces), and to generally inhibit the surface impact on the terrain over which the LSV travels. Thus, the tire pressure and suspension configuration of the LSV may also be governed by the real-time center of gravity and/or inertia of the LSV. In some examples, the controller may increase or decrease the air pressure in an air suspension system of the LSV based on the overlay of digital cartography/telematics data, as discussed above. As one example, consider that the digital cartography/telematics data indicates that the two left wheels are (or are about to) travel on a different type of terrain as compared to the right two wheels. In response, the controller may increase or decrease the air pressure of the air suspension system for the left two wheels or for the right two wheels, depending on the specific terrain types or features.

It should be appreciated that the above examples are not meant to be limiting, and there may be a diverse set of other circumstances when the center of gravity and/or the inertia of the LSV changes (e.g., such as changes to passenger and/or cargo loading, shifting of cargo while driving, movement of passengers while driving, etc.), causing the vehicular controller to generate instructions to modify the operation or configuration of the motors, braking systems, suspension, tire pressure, or other components of the LSV.

Once a set of operating instructions have been established, or are instantiated in real time, the vehicular controller executes the set of instructions to thereby enable the corresponding operating features of the LSV to take action. For example, in the specific example of motor torque as an operating parameter, the controller executes the generated set of wheel instructions to enable the motors to cause the set of controllable wheels to take the desire corresponding action.

Figure 9:
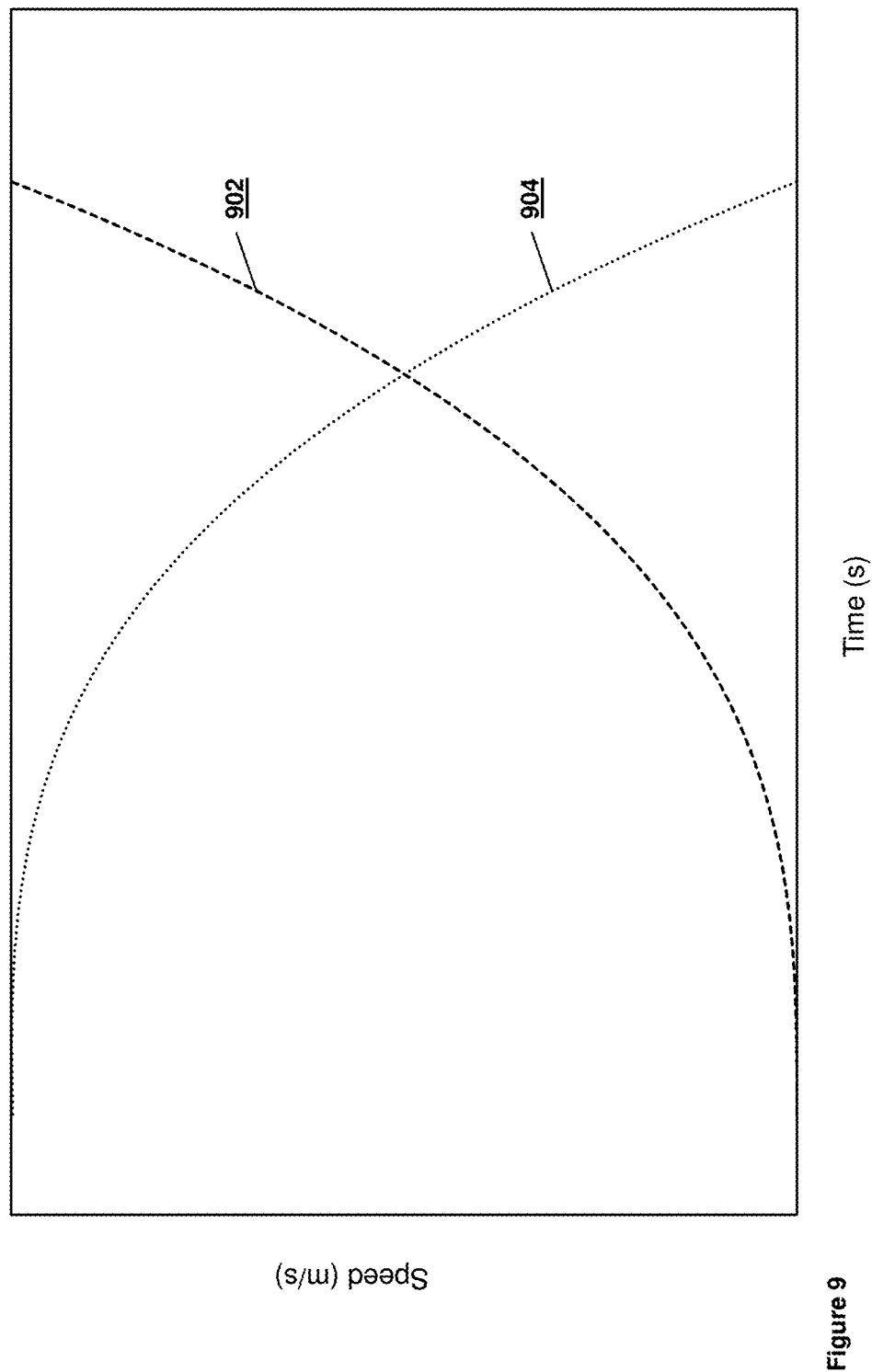
FIG. 9 provides exemplary velocity-time curves for an electric vehicle according to some embodiments.

FIG. 9 provides exemplary velocity-time curves for an LSV, in accordance with embodiments of the present disclosure, which provide a reference for discussing the disclosed smooth acceleration profiles. Generally, and in accordance with the embodiment disclosed herein, a smooth acceleration profile is useful for mitigating any potential surface impact that could otherwise be caused by a vehicle modulating its speed according to a rough acceleration profile. In an example, curve 902 provides an example of a velocity-time curve for an LSV that is accelerating (increasing speed), and curve 904 provides an example of a velocity-time curve for an LSV that is decelerating (decreasing speed). The derivative of the curve 902 provides acceleration as the LSV increases speed, and the derivative of the curve 904 provides acceleration as the LSV decreases speed. Thus, in some cases, the curves 902, 904 may be equivalently referred to as acceleration curves. By way of example, the curves 902, 904 may also generally be described as corresponding to a cubic function (e.g., $f(x)=x^3$). In accordance with various embodiments, the vehicular controller can control the throttle and brake responses such that the acceleration curves for the LSV, such as the curves 902, 904, have a continuously changing slope, thereby providing the smooth acceleration profile and safer operation of the LSV. In an example, tangent lines to the curves 902, 904 at adjacent points along the curves 902, 904 have different slopes such that the slope is continuously changing as a function of time. In at least some cases, the smooth acceleration profile may be at least partly defined by a specified rate of change of a torque supplied to one or more wheels of the LSV.

To provide the continuously changing slope, such as a continuously increasing slope when increasing the speed of the LSV or a continuously decreasing slope when decreasing the speed of the LSV, control of the throttle and braking systems of the LSV should be programmable. As such, the vehicular controller may provide instructions to control various drive-by-wire systems of the LSV, such as an electronic throttle control system and a brake-by-wire system. In some cases, the vehicular controller may further provide instructions to control a steer-by-wire system of the LSV, as described below. When increasing the speed of the LSV, for example, the vehicular controller may detect (e.g., using a variable resistor, Hall effect sensor, or other type of sensor) a position of the LSV's accelerator pedal as it is depressed by the driver. In response, the controller provides instructions to the electronic throttle control system, which for example may include instructions for the battery pack to transfer power (electric current) to one or more of the electric motors of the LSV to increase the speed of the LSV. Since the electric motors are controlled electronically, the vehicular controller can increase the speed of the LSV such that the acceleration curve for the LSV has a continuously changing slope.

Braking, or decreasing the speed of the LSV, may be accomplished in a variety of ways, but in each embodiment the vehicular controller can decrease the speed of the LSV such that the acceleration curve for the LSV has a continuously changing slope. In one example, the vehicular controller may detect (e.g., using a variable resistor, Hall effect sensor, or other type of sensor) a position of the LSV's accelerator pedal as it is released by the driver. In response, the controller provides instructions to the brake-by-wire system, for example instructions for the electric motor to operate in a regenerative braking mode, where power (electric current) is transferred from the electric motor to the battery pack, thereby charging the battery pack and decreasing the speed of the LSV. In some cases, once the LSV speed has been decreased to a low speed (e.g., such as less than 5 mph), the vehicular controller may engage a supplemental braking system (e.g., such as a friction braking system, which may include an electrohydraulic or electromechanical braking system or other type of supplemental braking system). In another exemplary brake-by-wire implementation, the vehicular controller may detect a position of an LSV brake pedal, separate from the accelerator pedal, as it is depressed by the driver, which the controller may use to determine the amount of braking force requested. For light pressure on the brake pedal, the controller may provide instructions to the brake-by-wire system, for example instructions for the electric motor to operate in the regenerative braking mode. In some embodiments, as the brake pedal is depressed further and the vehicular controller detects that the position of the brake pedal meets or exceeds a threshold value, the controller may then engage the supplemental braking system, for example, to bring the LSV to a complete stop.

In at least some cases, the supplemental braking system may be engaged concurrently with the regenerative braking system (e.g., when the electric motor-generator of the LSV is in the second mode of operation, as described above). Thus, in various examples, the controller may be configured to control a total braking force supplied to the one or more wheels of the LSV, where the total braking force includes a regenerative braking force, a supplemental braking force, or a combination of the regenerative braking force and the supplemental braking force. More specifically, the controller may determine and control the total braking force while the LSV travels in order to maximize energy regeneration provided by the regenerative braking system, while maintaining a smooth acceleration profile. In an example, and while decreasing the speed of the LSV, respective amounts of regenerative braking force and supplemental braking force may dynamically vary based on an instantaneous speed of the LSV. Generally, the regenerative braking force and associated energy regeneration is greater at higher speeds, meaning that the energy regeneration provided by the regenerative braking system decreases as the speed of the LSV decreases.

It is noted that the motive force or braking force provided to each wheel of the LSV may be controlled independently or collectively by the vehicular controller, which provides instructions to the various drive-by-wire systems of the LSV. As a result, the controller may selectively apply braking or motive forces where needed to one or more wheels of the LSV, in some embodiments based on the real-time center of gravity and/or inertia, to minimize any potential environmental impact while also maintaining safe operation of the LSV.

In various embodiments, the vehicular controller may likewise provide instructions to control a steer-by-wire system of the LSV, a previously noted. Generally, a steer-by-wire system uses electric motors to turn the wheels of the LSV, sensors to determine how much steering force to apply, and devices that provide tactile feedback to the driver (e.g., such as a reaction torque motor). In a steer-by-wire system, a steering wheel of the LSV is not mechanically connected to a steering gear. Instead, a steering actuator (e.g., such as an electromechanical actuator) provides the steering force to turn the wheels of the LSV (e.g., to a turning angle), while maintaining a smooth turning profile to regulate a surface impact on a terrain over which the LSV travels. The steering actuator may be coupled to and driven by an electric motor, where rotary motion of the electric motor is converted into linear displacement to turn the wheels of the LSV. The vehicular controller is electrically coupled to the steering actuator (e.g., coupled to the electric motor) to drive the steering actuator. In various examples, the vehicular controller may electrically steer the LSV, for example, based on a steering angle of the steering wheel (e.g., provided by a steering angle sensor), as well as any of a plurality of operating parameters of the LSV, either sensed or derived from sensor data captured from sensors coupled to the LSV, such as speed, orientation, position, turning radius, location, path, center of gravity, inertia, torque (e.g., such as via a steering torque sensor), turning angle of wheels of the LSV, or other sensed or derived parameter of the LSV. In some embodiments, the steer-by-wire system further includes a reaction torque motor (reaction torque actuator) that provides a natural steering feel and tactile feedback from the road to the driver by way of the steering wheel.

In some examples, the vehicular controller is configured to determine the real-time center of gravity and/or inertia of the LSV, as previously discussed, and to control the turning angle of wheels of the LSV based on the real-time center of gravity and/or inertia of the LSV. The smooth turning profile of the LSV, in some cases, may be described as turning without oversteering or understeering. The smooth turning profile of the LSV may further be described as including the smooth acceleration profile, as described above. That is, while turning the LSV, the vehicular controller may simultaneously and/or cooperatively control the steer-by-wire system, as well as the electronic throttle control system and the brake-by-wire system, in order to provide a smooth acceleration profile, for either increasing or decreasing the speed of the LSV, into and out of turns. The smooth acceleration profile, as previously discussed, includes an acceleration curve having a continuously changing slope. In some examples, the total available traction of each of the wheels of the LSV may be determined based on the real-time center of gravity and/or inertia, which may vary when the LSV turns. In response, and in some embodiments, the vehicular controller may control the turning angle of the wheels of the LSV (e.g., via the steering actuator), in some cases independent of each other, based on the total available traction of each of the wheels of the LSV to regulate the surface impact on the terrain over which the LSV travels. Additionally, while turning and in some cases, the vehicular controller may selectively supply the motive force or the braking force to respective wheels of the LSV, based on the total available traction of each of the wheels, to regulate the surface impact on the terrain over which the LSV travels. This may be particularly helpful in split friction situations, for instance, where different wheels are on different surface types (e.g., wet surface vs. dry surface).

While some examples of drive-by-wire systems have been given, it will be understood that these examples are not meant to be limiting, and the embodiments of the present disclosure, and their advantages as described herein, may be equally applicable to other implementations of drive-by-wire systems. In addition, it is noted that while some examples of controlling steering of an LSV have been given, various other aspects and/or features previously described with respect to the figures may also be applicable to steering (e.g., such as operational profiles, local context, geolocation and telematics, etc.). As merely one example, if the cartography/telematics data of the LSV indicates that the physical location of the LSV is a parking lot, the vehicular controller may modify a steering gear ratio (or a steering wheel to road wheel ratio) such that the driver need only turn the steering wheel by a relatively small steering angle to access the full (or large) range of turning angles of the wheels of the LSV to make parking easier and safer.

The above discussion has mainly focused on wheel-based LSVs. However, the described inventive subject matter is also applicable to other types of electric vehicles in view that nearly any kind of vehicle having motor-driven propulsion could leverage the location-based or vehicle parameter-based (e.g., center of gravity, inertia, etc.) operational profile management features. Example vehicles can include boats, ships, planes, drones, autonomous vehicles, motorcycles, single wheeled vehicles, unmanned vehicles, fan driven balloons, zeppelins, lighter than air crafts, snowmobiles, or other types of devices. Thus, by extension, motors do not necessarily have to be coupled to wheels, but could be coupled to other types of propulsion (e.g., treads, impellers, ducted fans, water or air propellers, robotic legs, etc.). Consider drones as an example. Electric drones are used for many purposes from hobby use-cases to military use-cases. Location-based operational profiles for such drones could include profiles to control maximum rotation speed of the drone's propellers in order to reduce noise (e.g., over a neighbor, over an active battlefield, etc.). Further, such restrictions can be further modified based on the local context, possibly based on ambient noise levels (e.g., raining, battle noise, highway noised, etc.), to alter the restrictions. More specifically, if the local ambient noise is high, then the local context might modify the value of the maximum rotational speed by permitting the drone to lift more, move faster, or otherwise have faster rotational speeds. Thus, in additional to other use-cases, the inventive subject matter is considered to include noise abatement. In addition, vehicle-parameter based operational profiles for drones, or modifications to an operational profile, could include profiles or profile modifications to control the maximum rotation speed of the drone's propellers, or other drone operational parameters, based on changes to the real-time center of gravity of the drone (e.g., such as a delivery drone with a shifting center of gravity due to loading/unloading of cargo, shifting cargo during flight, etc.).

In a somewhat similar vein to drones, the disclosed techniques could be used for lawn care devices (e.g., lawn mowers, robots, etc.) including robotic lawn mowers or other types of autonomous devices. Rather than merely have a robot perform a single task in a bounded area, the robot can consult operational profiles for an area and possibly modify the profile based on the local context to proceed with designated tasks. Returning to the environment of FIG. 1, a robot or a fleet of robots could tend to the various terrains in the environment. For example, a single automated lawn mower could use the profiles to determine which type of blades to use for the type of grass or what height the blades should be for the type of grass. As the mower shifts from the fairway to the pavement, the blade deck can be raised to permit faster movement. Thus, operational profiles may be used to fine-tune how automated devices operate in an environment and further refine operational parameters based on the local conditions or contexts. Additionally, the lawn care example also illustrates the operational profiles can be used to manage non-propulsion features (e.g., the lawn mower blade, blade deck, etc.). In a further lawn care example, vehicle-parameter based operational profiles for an automated lawn mower, or modifications to an operational profile, could include profiles or profile modifications to control the throttle or braking to one or more wheels of the lawn mower, or other lawn mower operational parameters, based on changes to the real-time center of gravity of the automated lawn mower (e.g., such as changes to the center of gravity due to changing lawn mower blades, changing blade deck height, filling/emptying of a lawn mower grass catcher, etc.).

Up to this point in the discussion regarding the inventive subject matter, the disclosed techniques have been presented from the perspective of a single LSV. In addition to managing the operational parameters or performance of a single LSV, fleets of LSVs could also be managed via these techniques. Thus, many LSVs, or other types of electric vehicles, can work together in concert to create a globally optimized set of operational tasks. For example, multiple devices (e.g., a set of heterogenous devices, a set of homogenous devices, etc.) could be optimized to reduce overall costs of charging, to reduce time to perform global activities (e.g., ground care, etc.), to increase coverage per unit time on surveillance footage, or other factors. In such widely varied multi-device use cases, each device could be governed by a single profile for a target zone and then modify the profiles for local conditions including real-time changes to center of gravity and/or inertia, or each device could obtain a profile that it most relevant to its local area and modify the profile as needed based on real-time changes to center of gravity and/or inertia. Such approaches permit multiple devices to work together without conflicting with each other by sharing workloads or cooperating with each other. Returning to the lawn mower and golf course example in FIG. 1, multiple, possibly automated lawn mowers, could share mowing the fairway to reduce the amount of time necessary to complete the task. Further, an automated charging station could travel around the environment to automatically swap or charge batteries of the lawn mowers, so they do not have to spend time traveling to and from a charging station. Yet further, operational profiles could permit or restrict the number of devices in a specific area (e.g., proximity to each other, density of devices, etc.) to reduce potential interference with each other, to reduce wear on the terrain, to improve logistics, or other factors.

Yet another interesting use case of the operational profiles relates to communications. Recall, in FIG. 3, the disclosed vehicular controller is shown as having a wireless communication interface (i.e., wireless communication interface 350). In some multi-device embodiments, it is possible that an environment might not permit all devices to access a central server or cloud infrastructure. In such cases, the vehicular controllers can establish a mesh or adhoc network for distributing operational profiles. For example, one or more LSVs that do have access to the profile database can download necessary profiles that are relevant to LSVs that are not connected to the profile database. Then, the profiles can be distributed to the various unconnected LSVs via the mesh or adhoc network via the wireless communications interface. Thus, LSVs can operate as a hub or proxy profile database or server.

In this view an operating environment can be quite varied or there can be multiple vehicles operating in the same environment, and there can be quite a diversity of operational profiles and/or corresponding local contexts. The diversity and possibly large number of profiles could be quite difficult to manage. Therefore, the inventive subject matter is considered to include infrastructure to support management of operational profiles. In more preferred embodiments, one or more web services (e.g., dashboards, APIs, etc.) are provided by which stakeholders are able to create or otherwise manage profiles. Such management services may be hosted on a local computer system, possibly for a fee, by which an environment manager can manage profiles or acceptable local contexts. In other scenarios, the services could be hosted on cloud-based systems, possibly accessed in exchange for a subscription fee. Preferred services offer multiple management functions including monitoring LSVs, inventorying LSVs and their individual capabilities or features, logging events generated by LSVs especially when the local context gives rise to potential conflicts about LSVs or with operational profiles, alerting stakeholders of specified events, reporting on conditions associated with one or more LSVs, recovering an LSV should adverse events take place, securing LSVs against unauthorized access or use, or engaging in other management functions.

Security can be considered a very interesting feature relating to the disclosed location-based profile management system. Operational profiles can further include security requirements, possibly in real-time, as LSVs move from position to position in an environment or as operators change. Thus, the operational profiles can include restrictions relating to the operator, who may be required to authenticate themselves when operating the LSV. Operational profiles can be provisioned with security features possibly including operator credentials or security protocols for establishing use (e.g., public key infrastructure (PKI)), hash-based message authentication code (HMAC), Secure Sockets Layer (SSL), certificates, multi-factor identification, etc.). In some embodiments, an operator could be given a keyfob having a specific radio-frequency identification (RFID) value. The LSV's operational profile can be provisioned with the expected RFID value so that only the specific keyfob will permit access, assuming the LSV is equipped with a RFID reader. Interestingly, RFID readers also permit inventorying equipment loaded in the LSV to ensure it is able to perform a targeted task where the equipment is considered to have RFID tags.

Operational profiles can be provisioned with features that are dictated by external authorities possibly accounting for local laws, government regulations, existing standards of operation, or other factors. For example, templates for operational profiles in national parks can be provisioned with a priori restrictions where LSVs can operate safely or under what conditions the LSV should operate to protect the operator, the vehicle, or the natural terrain. Thus, the operational profiles can be based on various requirements including performance goals, economic goals, task goals, evidence of use goals, adherence to standards, or other factors.

LSVs may also be equipped with one or more displays that enable a local stakeholder or operator to interface with the vehicular controller. Displays can be configured to render one or more aspects of the operational profiles or local contexts so that the operator is able to determine how best to utilize the LSV. Further, providing profile information to the operator enables the operator to understand under what circumstances or restrictions the LSV is operating. For example, as an LSV is approaching an environmental feature (e.g., a change in zone, a change in terrain, etc.), the display can notify the operator of potential changes in behavior of the LSV. Again, returning to FIG. 1 for a more specific example, as an LSV approaches the steep hill as determined from the heading and speed of the LSV, the display can indicate the steep hill has a restricted area or display an acceptable path through to take the hill. Further, the display can present wear-leveling information to the operator, which is especially useful in sensitive zones or in multi-device environments.

Use of the LSV is not restricted to just the behavior of the LSV itself. In addition to the operational parameters of the LSV, operational profiles can be provisioned with implementations of one or more recognition algorithms (e.g., OCR, SIFT, action recognition, pattern recognition, etc.). OpenCV (see URL opencv.org) or SciKit Learn (see URL scikit-learn.org/stable) offer many different types of pattern recognition algorithms, including machine learning algorithms that can be leveraged to identify patterns or items in an environment. Such features are advantageous to identify specific uses of an LSV based on actual operator behavior. For example, should an operator use the LSV in an unacceptable manner, the operational profile can be used to interrupt or stop the observed behavior. In addition, a warning can be rendered on the display of the LSV. Such observations can be based on multiple operating parameters of the LSV including speed, orientation, position, turning radius, location, path, center of gravity, inertia, or other sensed or derived parameter of the LSV.

Referring to FIG. 10, an exemplary method 1000 for controlling an electric vehicle, to regulate surface impact on an area of terrain over which the electric vehicle travels, is described. It is noted that, in accordance with various embodiments, such regulation may include inhibiting, reducing, eliminating, or otherwise mitigating an environmental impact (e.g., such as a surface impact), and the surface impact regulation itself may be achieved by the detailed techniques disclosed herein for controlling the LSV (e.g., by way of the vehicular controller). The method 1000 begins at block 1002, where an electric vehicle is provided. The electric vehicle may be any of the electric vehicles previously discussed, such as the LSV 200, 400, 700. In particular, the vehicle may include an electric motor-generator that supplies a motive force to one or more wheels of the vehicle while in a first mode of operation and supplies a regenerative braking force to one or more wheels of the vehicle while in a second mode of operation. The vehicle may further include a supplemental braking system (e.g., such as a friction braking system, etc.) that supplies a supplemental braking force. In addition, the vehicle includes a vehicular controller that is coupled to the electric motor-generator, the supplemental braking system, and other vehicle systems to control the vehicle (e.g., such as controlling a throttle response, a brake response, a suspension response, other suitable responses, and/or a combination thereof).

Method 1000 may proceed to block 1004, where a controller of the vehicle controls the vehicle to traverse the area. Block 1004 may include various processes for performing vehicle control, e.g., using an operational profile or modifying an operational profile based on a local context, which may include a real-time center of gravity and/or inertia. For example, at block 1006, the controller may collect, using any of a plurality of sensors coupled to the vehicle, sensor data. The sensor data may include environmental data associated with the area and/or vehicle information such as the geolocation of the vehicle, the vehicle's mass, acceleration, and loading (e.g., used to determine a real-time center of gravity and inertia of the vehicle), any other suitable environmental and/or vehicle data, and/or a combination thereof. At block 1008, the controller may then determine a real-time center of gravity and/or inertia based on the sensor data. As previously discussed, the center of gravity and/or inertia of the vehicle may vary based on changes to passenger and/or cargo loading, weight transfer during acceleration or braking, etc. In some embodiments, a total available traction of the vehicle may also be determined, by the controller, based on the real-time center of gravity.

At block 1010, the controller may generate an instruction set, based on the real-time center of gravity, inertia, and/or total available traction for traversing the area to inhibit surface impact. The instruction set may correspond to an operational profile, as previously discussed. In some cases, an operational profile is retrieved by the controller based on a location of the vehicle or based on the local context (e.g., such as local environmental data). The operational profile may be modified based on the real-time center of gravity and/or inertia, and a modified instruction set may be generated based on the modified operational profile. To be sure, in some examples, the operational profile itself may be retrieved based on the real-time center of gravity and/or inertia, as previously discussed. In some examples, the operational profile may also be modified based on historical data (e.g., such as historical surface impact data, historical location data, historical center of gravity data, historical inertia data, and/or or other historical vehicle and/or environmental data). Further, in some cases, the operational profile may be modified based on real-time surface impact data (e.g., collected using one or more of the plurality of sensors coupled to the vehicle). At block 1012, the controller may execute the instruction set to control the vehicle to traverse the area. In some cases, the executed instruction set will cause the vehicle to modulate a speed of the vehicle while maintaining a smooth acceleration profile. In some cases, executing the instructions causes the vehicle to selectively apply a motive force, a regenerative braking force, or a supplemental braking force to one or more wheels of the vehicle, for instance, based on the real-time center of gravity, inertia, and/or total available traction. Additionally, in some embodiments, the executed instruction set may cause the vehicle to control a suspension of the vehicle, a tire pressure of one or more wheels of the vehicle, or other systems and/or components of the vehicle.

Thereafter, the method 1000 returns to block 1006, where further sensor data is collected as the vehicle traverses the area. At block 1008, the controller may again determine the real-time center of gravity and/or inertia based on the sensor data. In various examples, the newly determined real-time center of gravity and/or inertia may be different than the previously determined real-time center of gravity and/or inertia (e.g., due to movements of passengers, shifting loads, weight transfer during acceleration or braking, etc.). In addition, an updated total available traction of the vehicle may also be determined, by the controller, based on the newly determined real-time center of gravity. At block 1010, the controller may generate another instruction set, based on the newly determined real-time center of gravity, inertia, and/or total available traction. In some cases, the newly generated instruction set may include an adjusted/revised version of the previously generated instruction set. In an example, when an operational profile is retrieved by the controller based on a location of the vehicle or based on the local context (e.g., such as local environmental data) and subsequently modified based on the previously determined real-time center of gravity and/or inertia, the operational profile may be further modified based on the newly determined real-time center of gravity and/or inertia. The newly generated instruction set may then be generated based on the further modified operational profile. In at least some examples, an updated operational profile itself may be retrieved based on the newly determined real-time center of gravity and/or inertia. At block 1012, the controller executes the newly generated instruction set to further control the vehicle to traverse the area. In some cases, the executed newly generated instruction set will cause the vehicle to further modulate a speed of the vehicle, while maintaining a smooth acceleration profile. In some examples, executing the newly generated instructions causes the vehicle to selectively apply a motive force, a regenerative braking force, or a supplemental braking force to one or more wheels of the vehicle, for instance, based on the newly determined real-time center of gravity, inertia, and/or total available traction. In addition, executing the newly generated instruction set may further cause the vehicle to further control the suspension of the vehicle, the tire pressure of one or more wheels of the vehicle, or other systems and/or components of the vehicle. It is noted that if the newly determined real-time center of gravity and/or inertia is the same as, or within a predefined threshold of (e.g., such as less than a 1% shift), the previously determined real-time center of gravity and/or inertia, then the newly generated instruction set may be the same as the previously generated instruction set. In other words, the controller may continue to execute the previously generated instruction set to further control the vehicle to traverse the area.

While the LSV could observe possible aberrant behavior and restrict such actions, the LSV system in general can collect use observations, aberrant or not, for future use. One use includes auditing the data, possibly for insurance purposes, to ensure the vehicles are properly used by or on behalf of a stakeholder (e.g., owner, lease holder, etc.). Another use can include compiling one or more machine learning training datasets. The training datasets can then be used to train machine learning models (e.g., artificial neural networks (ANNs), support-vector machines (SVM), random forests, Neuro-Evolution of Augmenting Topologies (NEAT), etc.) to identify acceptable or unacceptable behaviors. Additionally, such datasets can be leveraged to create automated routines or tasks that automated LSVs could take on in the future (e.g., lawn mowing, maintenance, delivery, etc.). In various embodiments, the disclosed techniques give rise to the ability to create automated or autonomous LSVs (e.g., drones, lawn mowers, snowplows, manned or unmanned vehicles, robots, etc.) that use the learned automated routines or tasks.

All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the vehicle. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." Unless otherwise noted in the claims, stated values shall be interpreted as illustrative only and shall not be taken to be limiting.

The specification, examples, and data provide a complete description of the structure and use of exemplary embodiments of the vehicle as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

It should be apparent to those skilled in the art that many more modifications besides those already described are possible without departing from the inventive concepts herein. The inventive subject matter, therefore, is not to be restricted except in the spirit of the appended claims. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification or claims refer to at least one of something selected from the group consisting of A, B, C . . . and N, the text should be interpreted as requiring only one element from the group, not A plus N, or B plus N, etc.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities of ingredients, properties such as concentration, reaction conditions, and so forth, used to describe and claim certain embodiments of the inventive subject matter are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the inventive subject matter are approximations, the numerical values set forth in the specific examples are reported as precisely as practicable. The numerical values presented in some embodiments of the inventive subject matter may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the inventive subject matter and does not pose a limitation on the scope of the inventive subject matter otherwise claimed. No language in the specification should be construed as indicating any non-claimed element essential to the practice of the inventive subject matter.

Groupings of alternative elements or embodiments of the inventive subject matter disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

What is claimed is:

1. A system for regulating impact of a low-speed vehicle (LSV) on a real-world environment, comprising:
   an electric motor-generator coupled to one or more wheels of the LSV, the electric motor-generator configured to supply a motive force to the one or more wheels in a first mode of operation, and configured to supply a regenerative braking force to the one or more wheels in a second mode of operation;
   a supplemental braking system configured to supply a supplemental braking force to the one or more wheels; and
   a controller coupled to the electric motor-generator and the supplemental braking system, wherein the controller is configured to control the electric motor-generator and the supplemental braking system to prevent the one or more wheels from rolling with slipping on a terrain over which the LSV travels by:
      controlling the electric motor-generator, while in the first mode of operation, to increase a speed of the LSV in correspondence with a first velocity-time curve defined by a first cubic function and prevent the one or more wheels from rolling with slipping as the LSV travels; and
      controlling both the electric motor-generator, while in the second mode of operation, and the supplemental braking system, to decrease the speed of the LSV in correspondence with a second velocity-time curve defined by a second cubic function and prevent the one or more wheels from rolling with slipping as the LSV travels.

2. The system of claim 1, wherein the electric motor-generator is coupled to one or more axles of the LSV to supply the motive force, in the first mode of operation, or the regenerative braking force, in the second mode of operation, to the one or more wheels of the LSV.

3. The system of claim 1, wherein the electric motor-generator includes an electric hub motor-generator disposed within the one or more wheels of the LSV to supply the motive force, in the first mode of operation, or the regenerative braking force, in the second mode of operation.

4. The system of claim 1, wherein the supplemental braking system includes a friction braking system.

5. The system of claim 1, wherein the electric motor-generator is configured to supply electrical energy to a battery pack while in the second mode of operation.

6. The system of claim 5, further comprising a battery management system, wherein the battery management system is configured to maintain a desired state of charge (SOC) of the battery pack while the LSV travels over the terrain.

7. The system of claim 1, wherein the controller is configured to control a total braking force supplied to the one or more wheels, and wherein the total braking force includes the regenerative braking force, the supplemental braking force, or a combination of the regenerative braking force and the supplemental braking force.

8. The system of claim 7, wherein the controller is configured to dynamically determine and control the total braking force while the LSV travels over the terrain, wherein respective amounts of the regenerative braking force and the supplemental braking force vary dynamically based on the speed of the LSV, and wherein the regenerative braking force and associated energy regeneration is based on the speed of the LSV.

9. The system of claim 1, wherein the controller is further configured to control the electric motor-generator and the supplemental braking system to prevent the one or more wheels from rolling with slipping on the terrain over which the LSV travels by:
  determining, in real-time, a center of gravity of the LSV as the LSV travels;
  based on the center of gravity determined in real-time, retrieving, or making adjustments to, one or more torque profiles; and
  using the one or more torque profiles to generate instructions for the electric motor-generator and the supplemental braking system to increase the speed of the LSV, while in the first mode of operation, or decrease the speed of the LSV, while in the second mode of operation, in correspondence with respective ones of the first velocity-time curve and the second velocity-time curve;
  wherein the generated instructions prevent the one or more wheels from rolling with slipping as the LSV travels.

10. A system for regulating impact of a low-speed vehicle (LSV) on a real-world environment, comprising:
  a motor coupled to one or more wheels of the LSV, the motor configured to supply a motive force to the one or more wheels of the LSV to increase a speed of the LSV to prevent the one or more wheels from rolling with slipping on a terrain over which the LSV travels;
  a braking system coupled to the one or more wheels of the LSV, the braking system configured to supply a braking force to the one or more wheels of the LSV to decrease the speed of the LSV to prevent the one or more wheels from rolling with slipping on the terrain over which the LSV travels; and
  a controller coupled to the motor and the braking system;
  wherein the controller is configured to determine a real-time center of gravity of the LSV, wherein the controller is configured to retrieve, or make adjustments to, one or more torque profiles based on the real-time center of gravity, and wherein the controller is configured to use the one or more torque profiles to generate instructions for the motor to modulate the speed of the LSV in correspondence with a velocity-time curve defined by a cubic function and prevent the one or more wheels from rolling with slipping on the terrain over which the LSV travels.

11. The system of claim 10, wherein the controller is further configured to determine, in real-time, an inertia of the LSV, wherein the controller is configured to retrieve, or make adjustments to, the one or more torque profiles based on the determined inertia, and wherein the controller is further configured to use the one or more torque profiles to generate the instructions for the motor to modulate the speed of the LSV in correspondence with the velocity-time curve defined by the cubic function and prevent the one or more wheels from rolling with slipping on the terrain over which the LSV travels.

12. The system of claim 10, wherein the controller is configured to generate an instruction to increase or decrease an air pressure in an air suspension system, based on the real-time center of gravity of the LSV, to prevent the one or more wheels from rolling with slipping on the terrain over which the LSV travels.

13. The system of claim 10, wherein the controller is configured to generate an instruction to increase or decrease a tire pressure of the one or more wheels of the LSV, based on the real-time center of gravity of the LSV, to prevent the one or more wheels from rolling with slipping on the terrain over which the LSV travels.

14. The system of claim 13, wherein the controller is configured to generate the instruction to increase or decrease the tire pressure of the one or more wheels of the LSV as the LSV transitions from one terrain type to another terrain type.

15. The system of claim 10, wherein the controller is configured to determine a total available traction of each of the one or more wheels of the LSV based at least partly on a shift in the real-time center of gravity of the LSV that corresponds to a weight transfer of the LSV.

16. The system of claim 15, wherein the controller is configured to supply the motive force or the braking force to respective ones of the one or more wheels of the LSV, based on the total available traction of each of the one or more wheels, to prevent the one or more wheels from rolling with slipping on the terrain over which the LSV travels.

17. The system of claim 15, wherein the controller is configured to modify the supplied motive force or the supplied braking force to respective ones of the one or more wheels of the LSV, based on the total available traction of each of the one or more wheels as the LSV transitions from one terrain type to another terrain type, to prevent the one or more wheels from rolling with slipping on the terrain over which the LSV travels.

18. A method for regulating impact of a low-speed vehicle (LSV) on a real-world environment, comprising:
  providing the LSV including an electric motor-generator, coupled to one or more wheels of the LSV, that supplies a motive force to the one or more wheels while in a first mode of operation and a regenerative braking force to the one or more wheels while in a second mode of operation, a supplemental braking system that supplies a supplemental braking force to the one or more wheels, and a controller coupled to the electric motor-generator and the supplemental braking system;
  retrieving, by the controller, sensor data from a plurality of sensors coupled to the LSV;
  determining, by the controller, a first real-time center of gravity of the LSV based on the retrieved sensor data;
  based on the first real-time center of gravity, retrieving or making adjustments to, by the controller, one or more torque profiles;

generating, by the controller and based on the one or more torque profiles, an instruction set for the electric motor-generator and the supplemental braking system for traversing an area to prevent the one or more wheels from rolling with slipping; and executing, by the controller, the instruction set to cause the LSV to modulate a speed of the LSV while traversing the area and preventing the one or more wheels from rolling with slipping.

19. The method of claim 18, further comprising:
determining, by the controller, an inertia of the LSV based on the retrieved sensor data;
based on the determined inertia, retrieving or making adjustments to, by the controller, the one or more torque profiles;
generating, by the controller and based on the one or more torque profiles, the instruction set; and
executing, by the controller, the instruction set to cause the LSV to modulate the speed of the LSV in correspondence with a velocity-time curve defined by a cubic function while traversing the area and preventing the one or more wheels from rolling with slipping.

20. The method of claim 18, wherein the executing the instruction set further causes the LSV to increase or decrease an air pressure in an air suspension system of the LSV to prevent the one or more wheels from rolling with slipping.

21. The method of claim 18, wherein the executing the instruction set further causes the LSV to increase or decrease a tire pressure of the one or more wheels of the LSV to prevent the one or more wheels from rolling with slipping.

22. The method of claim 21, wherein the executing the instruction set further causes the LSV to increase or decrease the tire pressure of the one or more wheels of the LSV as the LSV transitions from one terrain type to another terrain type.

23. The method of claim 18, further comprising:
determining, by the controller, a total available traction of the LSV based at least partly on a shift in the first real-time center of gravity that corresponds to a weight transfer of the LSV;
based on the total available traction, generating, by the controller, the instruction set for traversing the area to prevent the one or more wheels from rolling with slipping; and
executing, by the controller, the instruction set to cause the LSV to selectively apply the motive force, the regenerative braking force, or the supplemental braking force to the one or more wheels of the LSV to modulate the speed of the LSV in correspondence with a velocity-time curve defined by a cubic function.

24. The method of claim 18, further comprising:
determining, by the controller, a location of the LSV based on the retrieved sensor data;
retrieving, by the controller, the one or more torque profiles based on the determined location of the LSV;
modifying, by the controller, the one or more torque profiles based on the first real-time center of gravity;
generating, by the controller and based on the modified one or more torque profiles, a modified instruction set for the electric motor-generator and the supplemental braking system for traversing the area; and
executing, by the controller, the modified instruction set to cause the LSV to modulate the speed of the LSV in correspondence with a velocity-time curve defined by a cubic function while traversing the area and preventing the one or more wheels from rolling with slipping.

25. The method of claim 18, further comprising:
determining, by the controller, a second real-time center of gravity based on the retrieved sensor data as the LSV traverses the area, wherein the second real-time center of gravity is different than the first real-time center of gravity;
based on the second real-time center of gravity, making adjustments to, by the controller, the one or more torque profiles;
generating, by the controller and based on the adjusted one or more torque profiles, another instruction set for the electric motor-generator and the supplemental braking system for traversing the area to prevent the one or more wheels from rolling with slipping; and
executing, by the controller, the another instruction set to cause the LSV to modulate the speed of the LSV in correspondence with a velocity-time curve defined by a cubic function while traversing the area and preventing the one or more wheels from rolling with slipping.

26. The method of claim 18, wherein the executing the instruction set causes the LSV to modulate the speed of the LSV in correspondence with a velocity-time curve defined by a cubic function.

* * * * *